(12) United States Patent
Hieda et al.

(10) Patent No.: US 7,208,206 B2
(45) Date of Patent: Apr. 24, 2007

(54) GLASS CRACK PREVENTION LAMINATE AND LIQUID CRYSTAL DISPLAY DEVICE

(75) Inventors: Yoshihiro Hieda, Ibaraki (JP); Yuzo Akada, Ibaraki (JP); Toshitsugu Hosokawa, Ibaraki (JP); Kazuhiko Miyauchi, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 272 days.

(21) Appl. No.: 10/793,892

(22) Filed: Mar. 8, 2004

(65) Prior Publication Data

US 2004/0180148 A1    Sep. 16, 2004

(30) Foreign Application Priority Data

Mar. 10, 2003  (JP)  ............................ P2003-062828
Dec. 15, 2003  (JP)  ............................ P2003-416530

(51) Int. Cl.
*B32B 7/12*      (2006.01)
*G02F 1/1335*    (2006.01)

(52) U.S. Cl. ........................ 428/1.5; 428/1.6; 428/1.61; 428/352; 428/354; 428/355 R; 349/122

(58) Field of Classification Search ................. 428/1.1, 428/1.5, 411.1, 426, 428, 429, 430, 1.61, 428/352, 354, 355 R; 349/122
See application file for complete search history.

(56) References Cited

U.S. PATENT DOCUMENTS 6,002,456 A * 12/1999 Togawa ..................... 349/32
6,333,592 B1    12/2001 Sasa et al.
6,950,170 B2 *  9/2005 Nakahara et al. .......... 349/158
6,960,875 B2 * 11/2005 Morimoto et al. .......... 313/489
2003/0006704 A1  1/2003 Morimoto et al.
2005/0280758 A1 * 12/2005 Hino et al. ................. 349/117

FOREIGN PATENT DOCUMENTS

EP      1261011   * 11/2002
JP      6-75213 A    3/1994
JP      2000-9937 A  1/2000

(Continued)

OTHER PUBLICATIONS

English translation by computer for JP 2000-109771, http://www4.ipdl.ncipi.go.jp/Tokujitu/PAJdetail.ipdl?N0000=60&N0120=01&N2001=2&N3001=2000-109771771.*

(Continued)

*Primary Examiner*—Shean C Wu
(74) *Attorney, Agent, or Firm*—Sughrue Mion, PLLC

(57) ABSTRACT

A glass crack prevention laminate has a glass crack prevention adhesive layer having a dynamic storage elastic modulus G' of not larger than $1 \times 10^7$ Pa at 20° C., and a liquid crystal display optical film laminated on a surface of the glass crack prevention adhesive layer. Particularly, the liquid crystal display optical film is made of a polarizing plate or of a laminate of a polarizing plate and another optical layer. The thickness of the glass crack prevention adhesive layer is selected to be in a range of from 0.1 mm to 5 mm. The glass crack prevention adhesive layer has removability. The adhesive agent-including optical film having the configuration can be directly mounted on a liquid crystal panel so that the glass crack prevention adhesive layer is provided on an inner side. Thus, a liquid crystal display device can be provided.

15 Claims, 4 Drawing Sheets

FOREIGN PATENT DOCUMENTS

| | | |
|---|---|---|
| JP | 2000-109771 A | 4/2000 |
| JP | 2003-29644 A | 1/2003 |

OTHER PUBLICATIONS

English translation by computer for JP 2000-9937, http://www4.ipdl.ncipi.go.jp/Tokujitu/PAJdetail.ipdl?N0000=60&N0120=01&N2001=2&N3001=2000-009937.*

English translation by computer for JP 2003-29644, http://www4.ipdl.ncipi.go.jp/Tokujitu/PAJdetail.ipdl?N0000=60&N0120=01&N2001=2&N3001=2003-029644.*

English translation by computer for JP 06-75213, http://www4.ipdl.ncipi.go.jp/Tokujitu/PAJdetail.ipdl?N0000=60&N0120=01&N2001=2&N3001=H06-075213.*

* cited by examiner

GLASS CRACK PREVENTION LAMINATE AND LIQUID CRYSTAL DISPLAY DEVICE

The present application is based on Japanese Patent Applications No. 2003-062828 and 2003-416530, which are incorporated herein by reference.

BACKGROUND OF THE INVENTION

1. Field of the Invention

The present invention relates to a glass crack prevention laminate using a liquid crystal display optical film such as a polarizing plate, and a liquid crystal display method and device (LCD) using the glass crack prevention laminate.

2. Description of the Related Art

In a liquid crystal display according to the background art, it is essential from its image forming system that polarizing elements are disposed on opposite sides of a glass substrate which forms an outermost surface of a liquid crystal panel. Generally, a polarizing film (polarizing plate) is bonded to each surface of the liquid crystal panel.

Besides the polarizing film, various optical elements are used on each surface of the liquid crystal panel in order to improve display quality of the display. For example, a phase retarder film for preventing coloring and a luminance enhancement film for improving the viewing angle of the liquid crystal display are used. These films are generically called "optical films".

To bond such an optical film to a surface of a liquid crystal panel, an adhesive agent is generally used. Generally, the adhesive agent is provided on a surface of an optical film to prepare an adhesive agent-including optical film. The adhesive agent-including optical film is bonded to a surface of the liquid crystal panel because it has an advantage that the optical film can be instantaneously fixed to the outermost surface of the liquid crystal panel without necessity of any drying process for fixing the optical film.

The adhesive agent needs to have performance such as stress relaxation characteristic and removability to prevent any disadvantage caused by the adhesive agent in a durability test due to heating, moistening, etc. The stress relaxation characteristic is required so that optical irregularity can be prevented from being caused by change in size of the optical film. The removability is required so that the optical film can be removed from the surface of the liquid crystal panel when the optical film is bonded to a mistaken place of the surface of the liquid crystal panel or when an alien substance is lodged between the optical film and the liquid crystal panel.

To satisfy this requirement, an optical member capable of being removed and recycled (see Patent Document 1) and an adhesive sheet having removability and stress relaxation characteristic for preventing color unevenness (see Patent Document 2) have been proposed. In addition, a liquid crystal display device using an adhesive resin interposed between a liquid crystal panel and a transparent protective plate has been proposed as a device excellent in visibility (see Patent Document 3). In these proposals, there is no particular description about impact resistance and reliability.

On the other hand, an image display device (PDP, LCD) formed in such a manner that a display panel and a protective panel are closely bonded to each other through at least one layer of a transparent adhesive agent (see Patent Document 4). In this proposal, there is neither specific description about the LCD display device nor particular description about reliability of a liquid crystal optical film though there is description about excellence in impact resistance.

[Patent Document 1] JP-A-2000-9937
[Patent Document 2] JP-A-2000-109771
[Patent Document 3] JP-A-6-75213
[Patent Document 4] JP-A-2003-29644

In the aforementioned proposals, there is no description on crack prevention of the glass substrate of the liquid crystal panel. The glass substrate is easily cracked by impact power (0.5 J) produced when a steel ball having a diameter of 50 mm and a weight of about 500 g is dropped down from a height of 10 cm or by like impact power produced by a pendulum or spring impact hammer. For this reason, there is a problem that leakage of liquid crystal makes display defective.

As described above, various kinds of adhesive agent-including optical films have been heretofore proposed. In the proposals, there is description that the optical film has impact resistance to prevent the panel from cracking at 0.5 J, and that the optical film can be bonded to the panel without any void between the optical film and the panel. The various kinds of adhesive agent-including optical films are however still insufficient in reliability.

SUMMARY OF THE INVENTION

Upon such circumstances, an object of the invention is to provide an adhesive agent-including optical member which is excellent in reliability so that a glass substrate of a liquid crystal panel can be prevented from cracking due to external impact while a liquid crystal display optical film can be prevented from peeling, rising, etc. in a durability test due to heating, moistening, etc., and a liquid crystal display method and device using the adhesive agent-including optical member.

To achieve the foregoing object, the present inventors have made eager examination. As a result, it has been found that when an adhesive agent-including optical film (glass crack prevention laminate) prepared in such a manner that an adhesive agent satisfying a specific range of dynamic storage elastic modulus G' at 20° C. is provided on an optical film is bonded to at least a viewing side of a liquid crystal panel with the adhesive agent facing inward, cracking of a glass substrate can be prevented even in the case where external impact power of 0.5 J or higher to make it difficult to prevent cracking of the glass substrate in the background art acts on the liquid crystal panel because an optical film made of a polarizing plate or the like can be easily mounted on the liquid crystal while the liquid crystal panel can be protected by the mounted optical film. Thus, the invention has been accomplished.

That is, the invention provides an adhesive agent-including optical film including a glass crack prevention adhesive layer having a dynamic storage elastic modulus G' of not larger than $1\times10^7$ Pa at 20° C., and a liquid crystal display optical film laminated on a surface of the glass crack prevention adhesive layer.

The invention can also provide an adhesive agent-including optical film configured as described above, wherein the liquid crystal display optical film is made of either a polarizing plate or a laminate of a polarizing plate and another optical layer. The invention can further provide an adhesive agent-including optical film configured as described above, wherein the glass crack prevention adhesive layer has a thickness of 0.1 mm to 5 mm. The invention can further provide an adhesive agent-including optical film configured as described above, wherein the glass crack prevention adhesive layer has removability.

The invention can further provide a liquid crystal display device including a liquid crystal panel, and an adhesive agent-including optical film configured as described above and directly mounted on the liquid crystal panel so that the glass crack prevention adhesive layer of the adhesive agent-including optical film is located as an inner side.

The present inventors have made more eager examination. As a result, it has been found that when a laminated structure having a specific glass crack prevention adhesive layer provided on a surface of a liquid crystal display optical film through an undercoat layer, and a surface-treated film provided on the glass crack prevention adhesive layer is directly mounted on a liquid crystal panel through an adhesive agent so that the surface-treated film forms an outermost surface, a liquid crystal display device excellent in impact resistance and durability can be obtained so that impact resistance prevents a glass substrate of the liquid crystal panel from cracking under impact power of not lower than 0.5 J, and that a disadvantage in peeling, foaming, rising, etc. in a durability test due to heating, moistening, etc. can be avoided. Thus, the invention has been accomplished.

That is, the invention provides a glass crack prevention laminate including a liquid crystal display optical film, and a glass crack prevention adhesive layer provided on a surface of the liquid crystal display optical film with interposition of an undercoat layer and having a dynamic storage elastic modulus G' of not larger than $1 \times 10^7$ Pa at 20° C. The glass crack prevention laminate preferably further includes a surface-treated film provided on the glass crack prevention adhesive layer. Particularly, the liquid crystal display optical film is made of either a polarizing plate or a combination of a polarizing plate and another optical layer. The glass crack prevention adhesive layer has a thickness of 0.1 mm to 3 mm. The glass crack prevention adhesive layer contains a polar group. The undercoat layer is made of a member selected from the group consisting of a (poly)isocyanate compound, a (poly) ethylene-imine compound and an adhesive agent containing a (poly)isocyanate compound.

The invention also provides a liquid crystal display method comprising the step of directly mounting a glass crack prevention laminate defined above on a liquid crystal panel through an adhesive agent while locating the surface-treated film of the glass crack prevention laminate as an outermost surface, wherein liquid crystal display is performed in this state. The invention further provides a liquid crystal display device including a liquid crystal panel, and a glass crack prevention laminate defined above and directly mounted on the liquid crystal panel through an adhesive agent while the surface-treated film of the glass crack prevention laminate is located as an outermost surface.

As described above, the invention can provide a glass crack prevention laminate which has impact relaxation characteristic sufficient for impact resistance and is excellent in durability because the glass crack prevention laminate is formed as a laminated structure having a specific glass crack prevention adhesive layer provided on a surface of a liquid crystal display optical film through an undercoat layer. A surface-treated film is preferably provided on the glass crack prevention adhesive layer. The invention also provides a liquid crystal display method and a liquid crystal display device using the glass crack prevention laminate.

DETAILED DESCRIPTION OF THE PREFERRED EMBODIMENTS

An embodiment of the invention will be described below with reference to the drawings.

Figure 1:
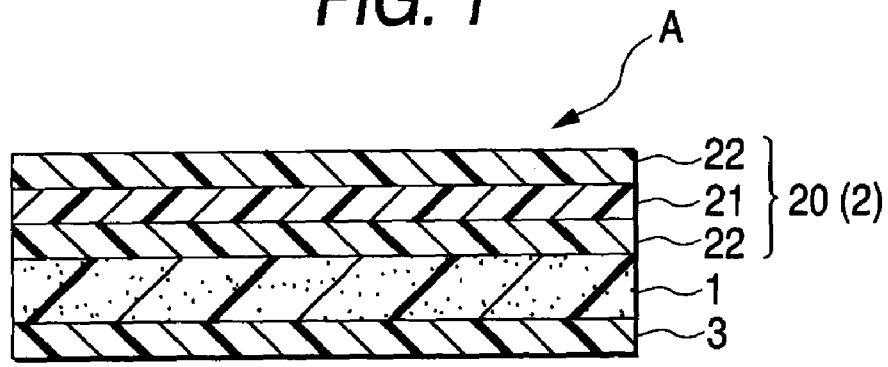
FIG. 1 is a sectional view showing an example of an adhesive agent-including optical film (glass crack prevention laminate) according to the invention.

FIG. 1 shows an example of an adhesive agent-including optical film according to the invention.

In FIG. 1, the adhesive agent-including optical film A as a glass crack prevention laminate includes a glass crack prevention adhesive layer 1, a liquid crystal display optical film 2 laminated on a surface of the glass crack prevention adhesive layer 1, and a releasable film 3 bonded onto the other surface of the glass crack prevention adhesive layer 1. The liquid crystal display optical film 2 is made of a polarizing plate 20 which is a laminate of a polarizer 21 and protective films 22, 22 located on opposite surfaces of the polarizer 21.

It is necessary that the glass crack prevention adhesive layer 1 generally has light-transmissivity of 60% or higher to exhibit good transparency and has a dynamic storage elastic modulus G' of not larger than $1 \times 10^7$ Pa, preferably in a range of from $7 \times 10^6$ Pa to $1 \times 10^3$ Pa at 20° C. When the dynamic storage elastic modulus G' is in the aforementioned range, external impact can be absorbed and relaxed so well that glass in a liquid crystal panel can be prevented effectively from cracking.

If the dynamic storage elastic modulus G' is larger than $1 \times 10^7$ Pa, external impact relaxation characteristic is so poor that a glass substrate of the liquid crystal panel will crack, for example, under external impact power of 0.5 J or higher. Incidentally, if the dynamic storage elastic modulus G' is smaller than $1 \times 10^3$ Pa, there arises a problem in projection of an edge portion because the glass crack prevention adhesive layer 2 is too soft to process at the time of punching or cutting in a sheeting process.

The thickness of the glass crack prevention adhesive layer 1 is selected to be preferably in a range of from 0.1 mm to 5 mm, especially preferably in a range of from 0.2 mm to 3 mm. If the thickness of the glass crack prevention adhesive layer 1 is smaller than 0.1 mm, a problem in safety or the like occurs easily because impact relaxation power is lowered to spoil the effect of preventing glass of a liquid crystal panel from cracking. If the thickness of the glass crack prevention adhesive layer 1 is larger than 5 mm, a problem in deterioration of an image occurs easily from the point of view of parallax.

The glass crack prevention adhesive layer 1 has such moderate adhesion that the adhesive agent-including optical film A can be directly bonded to a liquid crystal panel. The adhesion of the glass crack prevention adhesive layer 1 is generally selected to be not lower than 0.5 N/25 mm width, preferably not lower than 1.0 N/25 mm width in terms of 90° peel adhesive strength. It is preferable from the point of view of rework ability that the glass crack prevention adhesive layer 1 has such removability that the adhesive agent-including optical film A can be removed easily after bonded. The removability of the glass crack prevention adhesive layer 1 is selected to be not lower than 10 N/25 mm width, preferably not lower than 8 N/25 mm width in terms of 90° peel adhesive strength measured after the glass crack prevention adhesive layer 1 is left for 40 days at 80° C.

Further, a thin adhesive layer 50 μm or less in thickness may be formed on the surface of the aforementioned adhesive layer 1 via a hard film such as a polyester film to improve rework ability.

The material composition of the glass crack prevention adhesive layer 1 is not particularly limited as long as it has the aforementioned characteristic. Various kinds of adhesive agents such as an acrylic adhesive agent, a rubber adhesive agent, a polyester adhesive agent and a silicone adhesive agent known as transparent adhesive agents can be used. These may be of a thermal cross linkable type, an optical (ultraviolet light or electron beam) cross linkable type, or the like. From the point of view of transparency and durability, an acrylic adhesive agent may be used most preferably.

The acrylic adhesive agent may contain an acrylic polymer having transparency and a dynamic storage elastic modulus in the aforementioned range as a main component. If necessary, suitable additives may be added to the acrylic polymer. The acrylic adhesive agent maybe provided as a composite containing an inorganic filler or the like.

The acrylic polymer can be prepared from (meth)acrylic alkyl ester as a main component. If necessary, a modifying monomer which can be copolymerized with the main component is added to the main component in order to modify physical property such as optical characteristic and heat resistance. The mixture of these is polymerized by an ordinary method to thereby obtain the acrylic polymer. If necessary, the polymer may be suitably crosslinked in order to adjust adhesion (removability) and heat resistance of the polymer.

As the (meth)acrylic alkyl ester, there is used straight-chain or branched-chain (meth)acrylic alkyl ester containing an alkyl group having 1 to 18 carbon atoms, preferably 4 to 12 carbon atoms. Specific examples of the (meth)acrylic alkyl ester include butyl(meth)acrylate, isobutyl(meth)acrylate, hexyl(meth)acrylate, 2-ethylhexyl(meth)acrylate, isooctyl(meth)acrylate, isononyl(meth)acrylate, allyl(meth)acrylate, lauryl(meth)acrylate, and stearyl(meth)acrylate. One kind or two or more kinds selected from these examples can be used.

Examples of the modifying monomer include: hydroxy group-containing monomers such as 2-hydroxyethyl(meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, 10-hydroxydecyl(meth)acrylate, 12-hydroxylauryl(meth)acrylate, and (4-hydroxymethylcyclohexyl)-methyl acrylate; carboxyl group-containing monomers such as acrylic acid, methacrylic acid, carboxyethyl acrylate, carboxypentyl acrylate, itaconic acid, maleic acid, fumaric acid, and crotonic acid; acid anhydride group-containing monomers such as maleic anhydride, and itaconic anhydride; sulfonic group-containing monomers such as styrene sulfonate, allyl sulfonate, 2-(meth)acrylamide-2-methylpropane sulfonate, (meth)acrylamidepropane sulfonate, sulfopropyl(meth)acrylate, and (meth)acryloyloxynaphthalene sulfonate; and phosphoric group-containing monomers such as 2-hydroxyethylacryloyl phosphate.

Examples of the modifying monomer further include: (N-substitution) amide monomers such as (meth)acrylamide, N,N-dimethyl(meth)acrylamide, n-butyl(meth)acrylamide, N-methylol(meth)acrylamide, and N-methylolpropane(meth)acrylamide; (meth)acrylic alkyl aminoalkyl ester monomers such as aminoethyl(meth)acrylate, N,N-dimethylaminoethyl(meth)acrylate, and t-butylaminoethyl(meth)acrylate; (meth)acrylicalkoxyalkyl estermonomers such as methoxyethyl(meth)acrylate, and ethoxyethyl(meth)acrylate; and succinimide monomers such as N-(meth)acryloyloxymethylene succinimide, N-(meth)acryloyl-6-oxyhexamethylene succinimide, and N-(meth)acryloyl-8-oxyoctamethylene succinimide.

Examples of the other modifying monomer include: vinyl monomers such as vinyl acetate, vinyl propionate, N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinylcarboxylic amide, styrene, α-methylstyrene, and N-vinylcaprolactam; cyanoacrylate monomers such as acrylonitrile, and methacrylonitrile; epoxy group-containing acrylic monomers such as glycidyl(meth)acrylate; glycol acrylic ester monomers such as polyethylene glycol(meth)acrylate, polypropylene glycol(meth)acrylate, methoxyethylene glycol(meth)acrylate, and methoxypolypropylene glycol(meth)acrylate; and acrylic ester monomers such as tetrahydrofurfuryl(meth)acrylate, fluorine(meth)acrylate, silicone(meth)acrylate, and 2-methoxyethyl acrylate.

The (meth)acrylic alkyl ester and the modifying monomer may be mixed with each other so that the amount of the (meth)acrylic alkyl ester as a main component is in a range of from 60% by weight to 100% by weight, preferably in a range of from 70% by weight to 100% by weight whereas the amount of the modifying monomer is in a range of from 0% by weight to 40% by weight, preferably in a range of from 0% by weight to 30% by weight. When these components are used so as to satisfy the aforementioned ranges, the polymer can be obtained as a glass crack prevention adhesive agent good in impact relaxation characteristic.

The acrylic polymer can be synthesized by one of various known methods. For example, one kind of monomer selected from the aforementioned monomers or a mixture of two or more kinds of monomers selected from the aforementioned monomers may be polymerized by a solution polymerization method, an emulsion polymerization method, a bulk polymerization method, a suspension polymerization method or the like to thereby synthesize the acrylic polymer. In this case, apolymerization initiator may be used if necessary. A suitable initiator such as a thermopolymerization initiator or a photo-polymerization initiator may be used as the polymerization initiator in accordance with the polymerization method.

Another embodiment of the invention will be described below with reference to the drawings.

Figure 5:
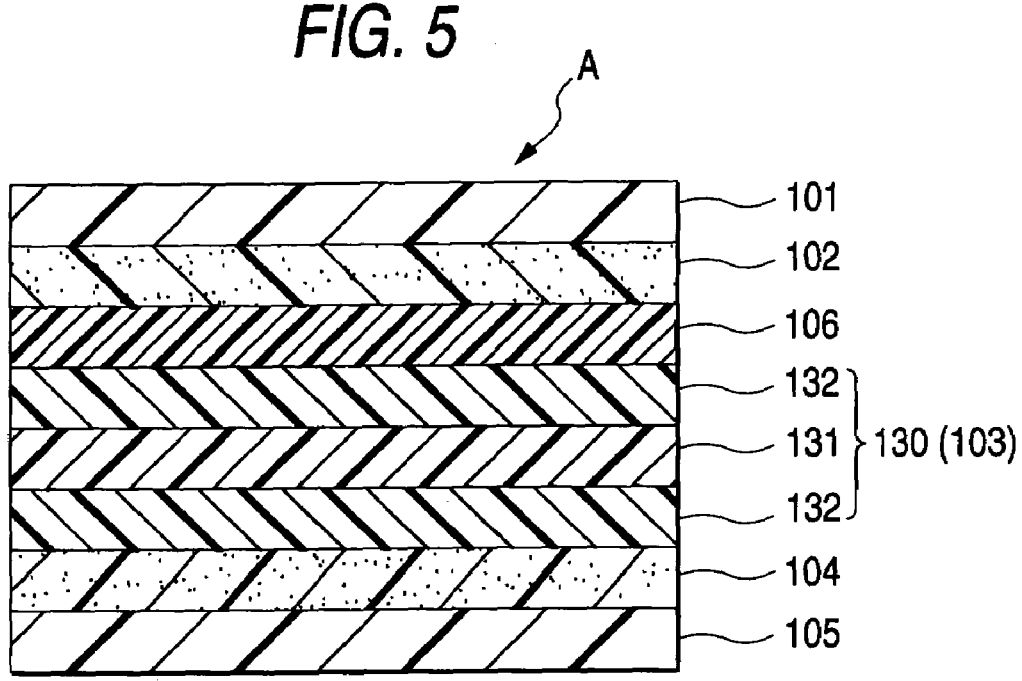
FIG. 5 is a sectional view showing an example of a glass crack prevention laminate according to the invention.

FIG. 5 shows an example of a glass crack prevention laminate according to the invention.

In FIG. 5, the glass crack prevention laminate A includes a liquid crystal display optical film 103, a glass crack prevention adhesive layer 102 provided on a surface of the liquid crystal display optical film 103 through an undercoat layer 106, a surface-treated film 101 provided on the glass crack prevention adhesive layer 102, and are leasable film 105 provided on the other surface of the liquid crystal display optical film 103 through an adhesive layer 104. The liquid crystal display optical film 103 is made of a polarizing plate 130 having a polarizer 131, and protective films 132 located on opposite surfaces of the polarizer 131.

It is necessary that the glass crack prevention adhesive layer 102 generally has transmissivity of 60% or higher to exhibit good transparency and has a dynamic storage elastic modulus G' of not larger than $1 \times 10^7$ Pa, preferably in a range of from $7 \times 10^6$ Pa to $1 \times 10^3$ Pa at 20° C. When the dynamic storage elastic modulus G' is in the aforementioned range, external impact can be absorbed and relaxed so well that glass in a liquid crystal panel can be prevented effectively from cracking.

If the dynamic storage elastic modulus G' is larger than $1 \times 10^7$ Pa, external impact relaxation characteristic is so poor that a glass substrate of the liquid crystal panel will crack, for example, at external impact power of 0.5 J or higher. Incidentally, if the dynamic storage elastic modulus G' is smaller than $1 \times 10^3$ Pa, there arises a problem in projection of an edge portion because the glass crack prevention adhesive layer 102 is too soft to process at the time of punching or cutting in a sheeting process.

The thickness of the glass crack prevention adhesive layer 102 is selected to be preferably in a range of from 0.1 mm to 5 mm, especially preferably in a range of from 0.2 mm to 3 mm. If the thickness of the glass crack prevention adhesive layer 102 is smaller than 0.1 mm, impact relaxation power is lowered to spoil the effect of preventing a glass substrate of a liquid crystal panel from cracking. If the thickness of the glass crack prevention adhesive layer 102 is larger than 5 mm, a problem in deterioration of an image occurs easily from the point of view of parallax.

The material composition of the glass crack prevention adhesive layer 102 is not particularly limited as long as it has the aforementioned characteristic. Various kinds of adhesive agents such as an acrylic adhesive agent, a rubber adhesive agent, a polyester adhesive agent and a silicone adhesive agent known as transparent adhesive agents can be used. These may be of a thermal crosslinkable type, an optical (ultraviolet light or electron beam) crosslinkable type, or the like. From the point of view of transparency and durability, an acrylic adhesive agent may be used most preferably.

The acrylic adhesive agent may contain an acrylic polymer having transparency and a dynamic storage elastic modulus in the aforementioned range as a main component. If necessary, suitable additives may be added to the acrylic polymer. The acrylic adhesive agent may be provided as a composite containing an inorganic filler or the like.

The acrylic polymer contains (meth) acrylic alkyl ester as a main component. Generally, a modifying monomer which can be copolymerized with the main component is added to the main component. The mixture of these is polymerized by an ordinary method to thereby obtain the acrylic polymer. If necessary, the polymer may be suitably crosslinked in order to adjust heat resistance.

As the (meth)acrylic alkyl ester, straight-chain or branched-chain (meth) acrylic alkyl ester containing an alkyl group having 1 to 18 carbon atoms, preferably 4 to 12 carbon atoms may be used preferably. Specific examples of the (meth)acrylic alkyl ester include butyl (meth)acrylate, isobutyl(meth)acrylate, hexyl(meth)acrylate, 2-ethylhexyl (meth)acrylate, isooctyl(meth)acrylate, isononyl(meth)acrylate, allyl(meth)acrylate, lauryl(meth)acrylate, and stearyl (meth)acrylate. One kind or two or more kinds selected from these compounds can be used.

A monomer having a polar group such as a hydroxyl group, a carboxyl group, an acid anhydride group, an epoxy group, an amino group, an amide group, a sulfonic group or a phosphoric group is preferably used as the modifying monomer. When the monomer is copolymerized with the main component so that the polar group is contained in the polymer, adhesion of the polymer to the liquid crystal display optical film through the undercoat layer can be improved. The amount of the polar group-containing monomer may be selected to be in a range of from 0.5% by weight to 40% by weight, preferably in a range of from 2% by weight to 30% by weight with the total amount of monomers in order to obtain the aforementioned effect.

Examples of the hydroxyl group-containing monomer include 2-hydroxyethyl(meth)acrylate, 2-hydroxypropyl (meth)acrylate, 4-hydroxybutyl(meth)acrylate, 6-hydroxyhexyl(meth)acrylate, 8-hydroxyoctyl(meth)acrylate, 10-hydroxydecyl(meth)acrylate, 12-hydroxylauryl(meth)acrylate, (4-hydroxymethylcyclohexyl)-methyl acrylate, polyethylene glycol(meth)acrylate, and propylene glycol(meth)acrylate.

Examples of the carboxyl group-containing monomer include (meth)acrylic acid, carboxyethyl acrylate, carboxypentyl acrylate, itaconic acid, maleic acid, fumaric acid, and crotonic acid. Examples of the acid anhydride group-containing monomer include maleic anhydride, and itaconic anhydride. An example of the epoxy group-containing monomer is glycidyl(meth)acrylate.

Examples of the amino group containing monomer include aminoethyl(meth)acrylate, N,N-dimethylaminoethyl (meth)acrylate, and t-butylaminoethyl(meth)acrylate. Examples of the amide group-containing monomer include (meth)acrylamide, N,N-dimethyl(meth)acrylamide, N-butyl (meth)acrylamide, N-methylol(meth)acrylamide, and N-methylolpropane(meth)acrylamide.

Examples of the sulfonic group-containing monomer include styrene sulfonate, allyl sulfonate, 2-(meth)acrylamide-2-methylpropane sulfonate, (meth)acrylamidepropane sulfonate, sulfopropyl(meth)acrylate, and (meth)acryloyloxynaphthalene sulfonate. An example of the phosphoric group-containing monomer is 2-hydroxyethylacryloyl phosphate.

Besides the polar group-containing monomer, any kind of monoethylene unsaturated monomer may be used as the modifying monomer.

Examples of the monoethylene unsaturated monomer include vinyl acetate, vinyl propionate, N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinylcarboxylic amide, styrene, α-methylstyrene, N-vinylcaprolactam, (meth)acrylonitrile, 2-methoxyethyl(meth) acrylate, 2-ethoxyethyl(meth)acrylate, methoxyethylene glycol(meth)acrylate, methoxypolypropylene glycol(meth) acrylate, N-(meth)acryloyloxymethylene succinimide, N-(meth)acryloyl-6-oxyhexamethylene succinimide, N-(meth)acryloyl-8-oxyoctamethylene succinimide, tetrahydrofurfuryl(meth)acrylate, fluorine (meth)acrylate, and silicone(meth)acrylate.

The (meth)acrylic alkyl ester and the modifying monomer which can be copolymerized with the (meth)acrylic alkyl ester may be mixed with each other so that the amount of the (meth)acrylic alkyl ester as a main component is in a range of from 60% by weight to 95% by weight, preferably in a range of from 80% by weight to 95% by weight whereas the amount of the modifying monomer (the total amount of the polar group-containing monomer and the monoethylene unsaturated monomer as the other monomer) is in a range of from 5% by weight to 40% by weight, preferably in a range of from 5% by weight to 20% by weight. When these components are used so as to satisfy the aforementioned ranges, adhesion of the polymer to the liquid crystal display optical film through the undercoat layer becomes so good that a glass crack prevention adhesive agent good in impact relaxation characteristic can be obtained.

The acrylic polymer can be synthesized by one of various known methods. For example, a mixture of two or more kinds of monomers as a mixture of the main component and the modifying monomer containing the polar group-containing monomer may be polymerized by a solution polymerization method, an emulsion polymerization method, a bulk polymerization method, a suspension polymerization method or the like to thereby synthesize the acrylicpolymer. In this case, apolymerization initiator may be used if necessary. A suitable initiator such as a thermo-polymerization initiator or a photo-polymerization initiator may be used as the polymerization initiator.

Examples of the photo-polymerization initiator include: acetophenone compounds such as 4-(2-hydroxyethoxy)phenyl(2-hydroxy-2-propyl)ketone, α-hydroxy-α,α'-dimethylacetophenone, methoxyacetophenone, 2,2-dimethoxy-2-phenylacetophenone, 2,2-diethoxyacetophenone, 1-hydroxycyclohexylphenylketone, and 2-methyl-1-[4-(methylthio)-phenyl]-2-morpholinopropane-1; benzoin ether compounds such as benzoin ethyl ether, benzoin isopropyl ether, and anyzoin methyl ether; α-ketol compounds such as 2-methyl-2-hydroxypropiophenone; ketal compounds such as benzyl dimethyl ketal; aromatic sulfonyl chloride compounds such as 2-naphthalene sulfonyl chloride; photoactivated oxime compounds such as 1-phenone-1,1-propanedione-2-(o-ethoxycarbonyl)oxime; and benzophenone compounds such as benzophenone, benzoyl benzoate, and 3,3'-dimethyl-4-methoxybenzophenone.

Examples of the thermo-polymerization initiator include organic peroxide-compounds such- as-benzoyl peroxide, t-butyl perbenzoate, cumene hydroperoxide, diisopropyl peroxydicarbonate, di-n-propyl peroxydicarbonate, di(2-ethoxyethyl)peroxydicarbonate, t-butyl peroxyneodecanoate, t-butyl peroxypivalate, (3,5,5-trimethylhexanoyl) peroxide, dipropionyl peroxide, and diacetyl peroxide; and azo compounds such as 2,2'-azobisisobutyronitrile, 2,2'-azobis(2-methylbutyronitrile), 1,1'-azobis(cyclohexane-1-carbonitrile), 2,2'-azobis(2,4-dimethylvaleronitrile), 2,2'-azobis(2,4-dimethyl-4-methoxyvaleronitrile), dimethyl-2,2'-azobis(2-methylpropionate), 4,4'-azobis(4-cyanovalerate), 2,2'-azobis(2-hydroxymethylpropionitrile), and 2,2'-azobis[2-(2-imidazoline-2-yl)propane].

The amount of the polymerization initiator used is selected suitably to be in a range of from 0.005 parts by weight to 5 parts by weight per 100 parts by weight of the monomer in accordance with the kind of the polymerization initiator. The amount of the photo-polymerization initiator maybe selected to be generally in a range of from 0.005 parts by weight to 1 part by weight, especially in a range of from 0.05 parts by weight to 0.5 parts by weight. If the amount of the photo-polymerization initiator is too small, a large amount of unreacted monomer remains after the start of photo-polymerization so that voids are generated easily in the bonding interface. If the amount of the photo-polymerization initiator is too large, the photo-polymerization initiator remains during the start of photo-polymerization to cause yellowing or the like.

For the same reason as described above, the amount of the thermo-polymerization initiator may be selected to be generally in a range of from 0.01 parts by weight to 5 parts by weight, especially in a range of from 0.05 parts by weight to 3 parts by weight.

If necessary, polyfunctional(meth)acrylate having two or more (meth)acryloyl groups in a molecule may be added together with the polymerization initiator so that the polyfunctional(meth)acrylate serves as a crosslinking agent (internal crosslinking agent) for improving the coagulation of the impact relaxing member to thereby increase shear strength when a polymerization reaction is carried out.

The amount of the polyfunctional(meth)acrylate used may be selected to be generally in a range of from 0.01 parts by weight to 10 parts by weight, preferably in a range of from 0.05 parts by weight to 5 parts by weight per 100 parts by weight of the monomer. In the case of two-functional (meth)acrylate, the amount of the (meth)acrylate may be preferably selected to be relatively large. In the case of polyfunctional (meth)acrylate having three or more functional groups, the amount of the (meth)acrylate may be preferably selected to be relatively small. If the amount of the polyfunctional (meth)acrylate is too small, the degree of crosslinking after photo-polymerization becomes so low that voids are generated easily in the bonding interface. If the amount of the polyfunctional (meth)acrylate is too large, adhesion becomes so low that swelling or the like occurs easily.

Examples of the polyfunctional (meth)acrylate include hexanediol di(meth)acrylate, (poly)ethylene glycol di(meth) acrylate, (poly)propylene glycol di(meth)acrylate, neopentyl glycol di(meth)acrylate, pentaerythritol di(meth)acrylate, trimethylolpropane tri(meth)acrylate, pentaerythritol tri (meth)acrylate, dipentaerythritol hexa(meth)acrylate, epoxy (meth)acrylate, polyester(meth)acrylate, and urethane(meth) acrylate.

The polymerization reaction is carried out by a photo-polymerization method using ultraviolet light or a thermo-polymerization in accordance with the kind of the polymerization initiator. From the point of view of processability to an adhesive sheet, adhesive physical property, etc., the photo-polymerization method is particularly preferred. The photo-polymerization method maybe preferably carried out in an oxygen-free atmosphere of replacement by inert gas such as nitrogen gas or in a state shielded from air by coating with an ultraviolet transmissive film.

Generally, ultraviolet light used in the photo-polymerization method is electromagnetic radiation having a wavelength in a range of from about 180 nm to 460 nm. Electromagnetic radiation having a longer or shorter wavelength than the aforementioned wavelength range may be used. As a ultraviolet light source, there is used an irradiation device such as a mercury arc lamp, a carbon arc lamp, a low-pressure mercury lamp, a middle-pressure mercury lamp, a high-pressure mercury lamp, a metal halide lamp, a chemical lamp, or a black-light lamp.

The intensity of ultraviolet light can be selected suitably by adjustment of the distance to the subject and the voltage applied. Generally, accumulated light intensity of 0.5 J/cm$^2$ to 10 J/cm$^2$ is preferably used in view of the economical setting of irradiation time (production efficiency). In addition, the adhesive agent maybe undulated by heat generated in polymerization when the thickness of the glass crack prevention adhesive layer is not smaller than 0.2 mm. The undulation of the adhesive agent can be suppressed by cooling at the time of photo-polymerization by means of liquid nitrogen steam, etc.

If necessary, one kind of plasticizer or two or more kinds of plasticizers good in transparency may be added to the glass crack prevention adhesive layer according to the invention regardless of whether the adhesive agent used in this layer is an acrylic adhesive agent or another type adhesive agent. The amount of the plasticizer is selected to be generally in a range of from 5 parts by weight to 300 parts by weight, preferably in a range of from 10 parts by weight to 200 parts by weight per 100 parts by weight of the base polymer such as an acrylic polymer.

Examples of the plasticizer include: phthalic compounds such as dimethyl phthalate, diethyl phthalate, dibutyl phthalate, diheptyl phthalate, di-2-ethylhexyl phthalate, diisononyl phthalate, diisodecyl phthalate, dibutylbenzyl phthalate, dioctyl phthalate, and butyl phthalyl butyl glycolate; adipic compounds such as diisobutyl adipate, diisononyl adipate, diisodecyl adipate, and dibutoxyethyl adipate; sebacic compounds such as dibutyl sebacate, and di-2-ethylhexyl sebacate; phosphoric compounds such as triethylene phosphate, triphenyl phosphate, tricresyl phosphate, trixylenyl phosphate, and cresyl phenyl phosphate; aliphatic compounds such as dioctyl sebacate, and methyl acetylricinoleate; epoxy compounds such as diisodecyl-4,5-epoxy tetrahydrophthalate; trimellitic compounds such as tributyl trimellitate, tri-2-ethylhexyl trimellitate, tri-n-octyl trimellitate, and triisodecyl trimellitate; and others such as butyl oleate, chlorinated paraffin, polypropylene glycol or polytetramethylene glycol as polyoxyalkylene glycol, polybutene, and polyisobutylene.

If necessary, suitable additives such as a coloring matter inclusive of pigment or dye having characteristic of absorbing near-infrared light (in a wavelength range of from 800 nm to 1100 nm) or neon light (in a wavelength range of from 570 nm to 590 nm), a tackifier, an anti-oxidizing agent, an age resistor, an ultraviolet absorbing agent, a silane coupling agent, natural or synthetic resins, an acrylic oligomer, glass fiber or glass beads may be added to the glass crack prevention adhesive layer as long as transparency is not spoiled. In addition, fine particles may be contained in the glass crack prevention adhesive layer so that the glass crack prevention adhesive layer can exhibit light-diffusing characteristic.

The glass crack prevention adhesive layer may be made of a composite material containing a high-molecular compound as a transparent resin or rubber component, and organic stratified clay minerals dispersed in the high-molecular compound. The high-molecular compound is not particularly limited if the composite material can be molded into a film as well as the organic stratified clay minerals can be dispersed in the high-molecular compound. When a high-molecular compound having a dynamic storage elastic modulus G' of not larger than $6 \times 10^6$ Pa (practically, in a range of from $1 \times 10^5$ Pa to $1 \times 10^3$ Pa) at 20° C. is used, external impact can be relaxed well to prevent effectively the glass substrate of the liquid crystal panel from cracking.

Examples of the high-molecular compound include rubber materials such as polyurethane rubber, polyester rubber, acrylic rubber, natural rubber, and butyl rubber. Among these materials, an acrylic high-molecular compound is especially useful from the point of view of heat resistance, reliability on moisture resistance, transparency, processability, affinity for organic stratified clay minerals, and so on.

In the glass crack prevention laminate A shown in FIG. 5, the undercoat layer 106 is provided for improving adhesion between the liquid crystal display optical film 103 (i.e., the protective film 132 of the polarizing plate 130) and the glass crack prevention adhesive layer 102 to thereby avoid disadvantages such as rising, peeling, foaming, etc. in a heat test at 80° C. and in a moist heat test at 60° C. and 90% RH.

Examples of the material of the undercoat layer include: (poly)isocyanate compounds such as 2,4-(or 2,6-)tolylene diisocyanate, xylene diisocyanate, 1,3-bis(isocyanatemethyl)cyclohexane, hexamethylene diisocyanate and norbornene diisocyanate; and (poly)ethylene-imine compounds. Adhesive agents such as an acrylic adhesive agent containing a (poly) isocyanate compound may be also used.

In the glass crack prevention laminate A in FIG. 5, the surface-treated film 101 provided on the glass crack prevention adhesive layer 102 is made of a plastic film excellent in transparency, mechanical strength, heat resistance, etc. Because this film is located on the outermost surface side, that is, the viewing surface side of the liquid crystal panel, this film is provided as a film subjected to a suitable surface treatment such as a hard-coating process, an anti-reflection process, an anti-glare process, an anti-sticking process, a diffusing process, an anti-reflection-including anti-glare process, an antistatic process, an anti-pollution process, etc.

Examples of the material of the plastic film include: polyester polymers such as polyethylene terephthalate, and polyethylene naphthalate; cellulose polymers such as diacetyl cellulose, and triacetyl cellulose; acrylic polymers such as polymethyl (meth)acrylate; styrene polymers such as polystyrene, and acrylonitrile-styrene copolymer (AS resin); and polycarbonate polymers.

Examples of the material of the plastic film further include: polyolefin polymers such as polyethylene, polypropylene, polyolefin having a cyclo or norbornene structure, and ethylene-propylene copolymer; aromatic polyamide polymers; imide polymers; sulfone polymers, polyethersulfone polymers; polyether-ether-ketone polymers; vinyl butyral polymers; allylate polymers; polyoxymethylene polymers; epoxy polymers; and blends of these polymers.

Among the materials of these films, polyester polymers such as polyethylene terephthalate, and polyethylene naphthalate, cellulose polymers such as diacetyl cellulose, and triacetyl cellulose, and epoxy polymers are especially preferred.

Because the plastic film is formed on the viewing side of the liquid crystal panel, the thickness of the plastic film is preferably selected to be in a range of from 100 μm to 500 μm in order to protect the panel. The plastic film may be a single layer or a laminate of a plurality of layers. The inner surface side of the film, that is, the side adhering to the glass crack prevention adhesive layer may be subjected to a treatment such as a corona process or an ordinary temperature plasma process in order to improve the adhesion. The treated surface may be directly coated with the glass crack prevention adhesive agent to thereby form the glass crack prevention adhesive layer.

Especially, the hard-coating process among the surface treatments applied to the outermost surface side of the plastic film is carried out in order to prevent a surface of the liquid crystal panel from being injured. For example, the hard-coating process can be carried out by a method in which a hardened film made of a suitable ultraviolet-curable resin such as an acrylic resin or a silicone resin and excellent in hardness and slip characteristic is applied on a surface of the plastic film. The anti-reflection process is carried out in order to prevent external light from being reflected in a surface of the optical film. For example, the anti-reflection process can be carried out by a method of forming an anti-reflection film according to the background art.

The anti-glare process is carried out in order to prevent visibility of light transmitted through the polarizing plate from being disturbed by reflection of external light in a surface of the optical film. For example, a fine roughness structure is given to a surface of the film by a suitable method such as a surface roughening method using sandblasting or embossing or a method of mixing transparent particles to thereby carry out the anti-glare process. The anti-glare process may serve also as a process for producing a diffusing layer (having a viewing angle enlarging function, etc.) for diffusing light transmitted through the polarizing plate to thereby enlarge the viewing angle.

As the transparent fine particles for giving the fine roughness structure, there are used fine particles having a mean particle size of 0.5 μm to 50 μm. Examples of the transparent fine particles include: inorganic fine particles of silica, alumina, titania, zirconia, tinoxide, indiumoxide, cadmium oxide, antimony oxide, or the like; and organic fine particles. The amount of the transparent particles used is selected to be generally in a range of from 2 parts by weight to 50 parts by weight, especially in a range of from 5 parts by weight to 25 parts by weight per 100 parts by weight of the resin which forms the fine roughness structure.

In the adhesive agent-including optical film A in FIG. 1, the liquid crystal display optical film 2 is laminated on a surface of the glass crack prevention adhesive layer 1. The liquid crystal display optical film 2 is made of a polarizing plate 20 which is a laminate of a polarizer 21 and protective films 22, 22 located on opposite surfaces of the polarizer 21. On the other hand, in the glass crack prevention laminate A in FIG. 5, the liquid crystal display optical film 103 having a surface on which the glass crack prevention adhesive layer 102 is provided through the undercoat layer 106 is made of a polarizing plate 130 including a polarizer 131, and protective films 132 located on opposite surfaces of the polarizer 131.

Examples of the polarizer 21, 131 include: a film prepared by adsorbing iodine and/or dichromatic dye onto a hydrophilic high-molecular film such as a polyvinyl alcohol film, a partially formalized polyvinyl alcohol film or an ethylene-vinyl acetate copolymer saponified film and stretching the hydrophilic high-molecular film; and an oriented film of polyene such as dehydrated polyvinyl alcohol or dehydrochlorinated polyvinyl chloride. The thickness of the polarizer made of such a film is generally in a range of from 5 μm to 80 μm but is not particularly limited thereto.

As the material of each of the protective films 22, 22, 132, 132, a material excellent in transparency, mechanical strength, thermal stability, moisture sealability and isotropy is preferred. Examples of the material of each of the protective films 22, 22, 132, 132 include: polyester polymers such as polyethylene terephthalate, and polyethylene naphthalate; cellulose polymers such as diacetyl cellulose, and triacetyl cellulose; acrylic polymers such as polymethyl (meth)acrylate; styrene polymers such as polystyrene, and acrylonitrile-styrene copolymer (AS resin); and polycarbonate polymers.

Examples of the material of each of the protective films 132, 132 further include: polyolefin polymers such as polyethylene, polypropylene, polyolefin having a cyclo or norbornene structure, and ethylene-propylene copolymer; vinyl chloride polymers; aromatic polyamide polymers such as Nylon; imide polymers; sulfone polymers, polyether-sulfone polymers; polyether-ether-ketone polymers; vinylidene chloride polymers; vinyl alcohol polymers; vinyl butyral polymers; allylate polymers; polyoxymethylene polymers; epoxy polymers; and blends of these polymers.

Especially, a film made of a cellulose polymer may be preferably used as each of the protective films 22, 22, 132, 132. The thickness of each protective film is not particularly limited. The thickness of each protective film is selected to be generally not larger than 500 μm, preferably in a range of from 1 μm to 300 μm, especially preferably in a range of from 5 μm to 200 μm.

An isocyanate adhesive agent, a polyvinyl alcohol adhesive agent, a gelatin adhesive agent, a vinyl latex adhesive agent, a water type proester adhesive agent, or the like, may be used for bonding each of the protective films 22, 132 to the polarizer 21, 131.

Although this example shows the case where protective films 22, 22, 132, 132 are provided on opposite surfaces of the polarizer 21, 131 to thereby form the polarizing plate 20, 130, the invention may be applied to the case where a protective film 22, 132 is provided on a surface of the polarizer 21, 131 to thereby form the polarizing plate 20, 130.

An exposed surface-side one 22 of the protective films 22, 22 in FIG. 1 may be subjected to a suitable process such as a hard-coating process, an anti-reflection process, an anti-sticking process, a diffusing process, an anti-glare process, an anti-reflection-including anti-glare process, an antistatic process, an anti-pollution process, etc. Alternatively, another film subjected to the same process as described above may be bonded to the exposed surface-side protective film 22.

The hard-coating process is carried out in order to prevent a surface of the optical film from being injured. For example, the hard-coating process can be carried out by a method in which a hardened film made of a suitable ultraviolet-curable resin such as an acrylic resin or a silicone resin and excellent in hardness and slip characteristic is applied on a surface of the film. The anti-reflection process is carried out in order to prevent external light from being reflected in a surface of the optical film. For example, the anti-reflection process can be carried out by a known method of forming an anti-reflection film.

The anti-glare process is carried out in order to prevent visibility of light transmitted through the optical film from being disturbed by reflection of external light in a surface of the optical film. For example, a fine roughness structure is given to a surface of the film by a suitable method such as a film surface roughening method using sandblasting or embossing or a method of mixing transparent fine particles to thereby carry out the anti-glare process. The anti-glare process may serve also as a process for producing a diffusing layer (having a viewing angle enlarging function, etc.) for diffusing light transmitted through the optical film to thereby enlarge the viewing angle.

As the transparent fine particles for giving the fine roughness structure, there are used fine particles having a mean particle size of from 0.5 μm to 50 μm. Examples of the transparent fine particles include: inorganic fine particles of silica, alumina, titania, zirconia, tinoxide, indiumoxide, cadmium oxide, antimony oxide, or the like; and organic fine particles. The amount of the transparent fine particles used is selected to be generally in a range of from 2 parts by weight to 50 parts by weight, preferably in a range of from 5 parts by weight to 25 parts by weight per 100 parts by weight of the resin which forms the fine roughness structure.

Figure 2:
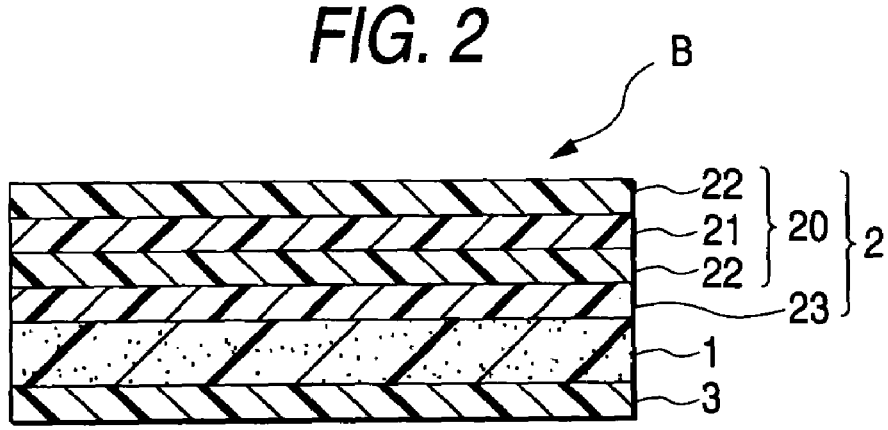
FIG. 2 is a sectional view showing another example of the adhesive agent-including optical film (glass crack prevention laminate) according to the invention.
Figure 6:
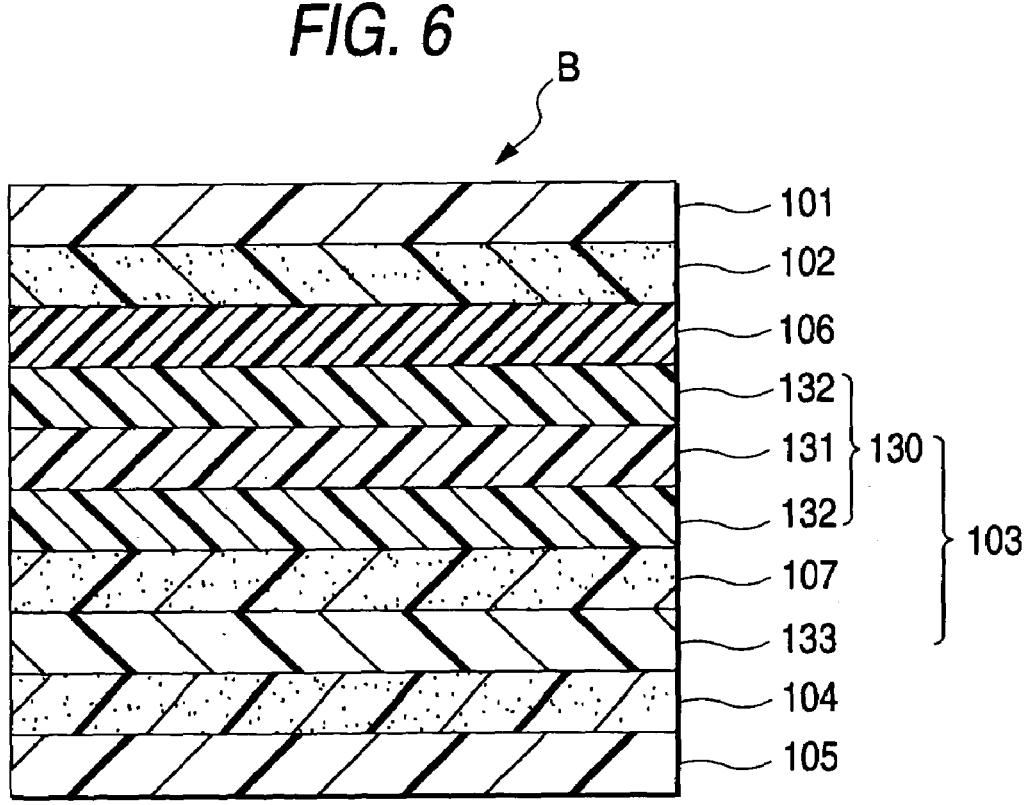
FIG. 6 is a sectional view showing another example of the glass crack prevention laminate according to the invention.

Although FIGS. 1 and 5 show the case where the liquid crystal display optical film 2, 103 is made of a polarizing plate 20, 130 using a polarizer 21, 131 as a single optical layer, the invention may be applied to the case where the liquid crystal display optical film 2, 103 is made of a laminate including a polarizing plate 20, 130 and another optical layer. FIGS. 2 and 6 show the latter case.

FIGS. 2 and 6 show a glass crack prevention laminate (adhesive agent-including optical film) B according to the invention. In FIGS. 2 and 6, a phase retarder 23, 133 is further laminated on the polarizing plate 20, 130 having the polarizer 21, 131 and the protective films 132, 132, especially through an adhesive layer 107 in FIG. 6 to thereby form the liquid crystal display optical film 2, 103 as an elliptically or circularly polarizing plate. Other constituent elements are the same as those in FIGS. 1 and 5. Parts the same as those in FIG. 1 and 5 are referred to by numerals the same as those in FIGS. 1 and 5 for the sake of omission of duplicated description.

The elliptically or circularly polarizing plate obtained by further laminating the phase retarder on the polarizing plate is used for converting linearly polarized light into elliptically or circularly polarized light, converting elliptically or circularly polarized light into linearly polarized light or converting the direction of polarization of linearly polarized light. A quarter-wave plate (λ/4 plate) is used particularly as a phase retarder for converting linearly polarized light into circularly polarized light or converting circularly polarized light into linearly polarized light. A half-wave plate is generally used for converting the direction of polarization of linearly polarized light.

An elliptically polarizing plate is effectively used for compensating for coloring caused by birefringence of an STN liquid crystal display device to achieve monochromatic display without coloring. Three-dimensional refractive indices may be preferably controlled to make it possible to compensate for coloring generated in oblique view of a display screen of a liquid crystal display device. A circularly polarizing plate is effectively used for adjusting the color tone of an image on a reflective liquid crystal display device, for example, for color-displaying an image. The circularly polarizing plate also has an anti-reflection function.

The material of the phase retarder 23, 133 is not particularly limited. Examples of the material of the phase retarder 23, 133 include: a birefringent film prepared by stretching a known high-molecular material uniaxialy or biaxially; an oriented film of a liquid crystal polymer; and a film by which an oriented layer of a liquid crystal polymer is supported. The thickness of the phase retarder 23, 133 is not particularly limited. Generally, the thickness of the phase retarder 133 is selected to be in a range of from 20 μm to 150 μm.

For example, the phase retarder 23, 133 may be provided for the purpose of compensating for viewing of coloring caused by birefringence of various kinds of wavelength plates and liquid crystal layers. The phase retarder 23, 133 may have a suitable retardation in accordance with this applied purpose. The phase retarder 23, 133 may be provided as a laminate of two or more phase retarders in order to control optical characteristic such as a retardation. Two polarizing plates may be provided for one liquid crystal panel. In this case, one phase retarder or a plurality of phase retarders may be provided in an arbitrary position between the liquid crystal panel and each of the two polarizing plates.

Although this embodiment has been described on the case where the liquid crystal display optical film 2, 103 is formed as an elliptically or circularly polarizing plate made of a laminate of a polarizing plate and a phase retarder, the invention may be applied to the case where one layer or two or more layers selected from various kinds of known optical layers such as a reflecting plates a semi-transmissive reflecting plate, a viewing angle compensating film, a luminance enhancement film, etc. for liquid crystal display device are laminated as other optical layers on the polarizing plate.

Examples of the liquid crystal display optical film 3 include: a reflective polarizing plate made of a laminate of a polarizing plate and a reflecting plate; a semi-transmissive polarizing plate made of a laminate of a polarizing plate and a semi-transmissive reflecting plate; a wide viewing angle polarizing plate made of a laminate of a polarizing plate and a viewing angle compensating film; a laminate of a polarizing plate and a luminance enhancement film; a combination of at least two plates selected from these plates; a reflective circularly polarizing plate made of a combination of the reflective polarizing plate and a phase retarder; and a semi-transmissive elliptically polarizing plate made of a combination of the semi-transmissive polarizing plate and a phase retarder.

The reflective polarizing plate is made of a laminate of a polarizing plate and a reflecting plate. The reflective polarizing plate is of a type in which incident light from the viewing side (display side) is reflected so as to be used for display. Because it is possible to omit any built-in light source such as a backlight unit, the reflective polarizing plate has an advantage in that reduction in thickness of a liquid crystal display device can be achieved easily.

The reflective polarizing plate can be produced by a method in which a reflecting layer of a metal is attached onto a surface of a polarizing plate through a protective film. The method for producing the reflective polarizing plate is not particularly limited. Known techniques can be used widely. For example, a method using a reflecting sheet made of another film provided with a reflecting layer may be used. The reflecting layer is generally made of a metal. From the point of view of prevention of lowering of reflectivity caused by oxidation, long-term duration of initial reflectivity, avoidance of provision of another protective film, etc., it is particularly preferable that the reflective polarizing plate is used in the condition that a reflecting surface of the reflecting layer is coated with a protective film, a polarizer, or the like.

The semi-transmissive polarizing plate can be obtained in such a manner that the reflecting layer in the aforementioned reflective polarizing plate is formed as a semi-transmissive reflecting layer such as a half mirror capable of reflecting and transmitting light. The semi-transmissive polarizing plate can be generally provided on a rear side of a liquid crystal cell to form a liquid crystal display device of the type in which incident light from the viewing side is reflected by the semi-transmissive polarizing plate in order to display an image in a relatively bright atmosphere and in which a built in light source such as a backlight unit included in a back side of the semi-transmissive polarizing plate is used in order to display an image in a relatively dark atmosphere.

The viewing angle compensating film is provided for widening the viewing angle so that an image can be observed relatively sharply even in the case where a display screen of a liquid crystal display device is viewed not perpendicularly but slightly obliquely. Examples of the viewing angle compensating phase retarder include a phase retarder film, an oriented film of a liquid crystal polymer or the like, and a transparent substrate provided with an oriented layer of a liquid crystal polymer or the like.

In a general phase retarder, there is used a polymer film stretched uniaxially in a planar direction so as to have birefringence. In a phase retarder used as the viewing angle compensating film, there is used a polymer film stretched biaxially in a planar direction so as to have birefringence or a biaxially stretched film such as a polymer or gradient oriented film stretched uniaxially in a planer direction and stretched in a direction of thickness so as to have birefringence with refractive indices controlled in the direction of thickness.

The gradient oriented film is not particularly limited. A gradient oriented film produced by a known technique can be used. In order to achieve the viewing angle widened in terms of visibility, there can be preferably used an optically compensating phase retarder which is formed in such a manner that an optically an isotropic layer made of an oriented layer of a liquid crystal polymer, especially a gradient oriented layer of a discotic liquid crystal polymer is supported by a triacetyl cellulose film.

A laminate of a polarizing plate and a luminance enhancement film is generally provided on a rear side of a liquid crystal cell. The luminance enhancement film exhibits such characteristic that a part of light such as linearly polarized light in a predetermined axis of polarization or circularly polarized light in a predetermined direction is reflected but the other part of light is transmitted when natural light is incident onto the luminance enhancement film from a backlight unit of a liquid crystal display device or through reflection from a rear side of the liquid crystal display device.

The laminate of the polarizing plate and the luminance enhancement film transmits a part of light in a predetermined state of polarization but reflects the other part of light in the other state when light from the light source such as a backlight unit is incident on the laminate. Light reflected by the luminance enhancement film surface is further reversed in direction by a reflecting layer or the like provided on the rear side so that the light is made incident onto the luminance enhancement film again. The luminance enhancement film transmits part of all of the light as light in a predetermined state of polarization in order to achieve increase in intensity of light transmitted through the luminance enhancement film. In addition, the laminate supplies polarized light incapable of being absorbed to the polarizer to achieve increase in intensity of light allowed to be used by the liquid crystal display device to thereby enhance luminance.

A diffusing plate may be provided between the luminance enhancement film and the reflecting layer or the like.

The polarized light reflected by the luminance enhancement film advances toward the reflecting layer. The diffusing plate provided as described above diffuses the polarized light evenly when the light is transmitted through the diffusing plate. At the same time, the diffusing plate eliminates the state of polarization of the light, so that the polarized light is converted into non-polarized light. That is, the diffusing plate restores the polarized light to original natural light. The non-polarized light, that is, the light in a natural light state advances toward the reflecting layer or the like and is reflected by the reflecting layer. The reflected light is transmitted through the diffusing plate so as to be made incident onto the luminance enhancement film again. This operation is repeated.

When the diffusing plate for restoring polarized light to the original natural light state is provided between the luminance enhancement film and the reflecting layer or the like in the aforementioned manner, a uniform and bright display screen can be obtained because unevenness in brightness of the display screen can be reduced while brightness of the display screen can be kept. Because the number of repeated reflections of initial incident light can be increased moderately when the diffusing plate is provided in the aforementioned manner, a uniform and bright display screen can be obtained by increase in number of repeated reflections in cooperation with the diffusing function of the diffusing plate.

The luminance enhancement film is not particularly limited. Any suitable film may be used as the luminance enhancement film. Examples of the suitable film include: a film exhibiting characteristic of transmitting linearly polarized light in a predetermined axis of polarization but reflecting the other part of light, such as a multilayer dielectric thin film or a multilayer laminate of thin films different in refractive index an isotropy; and a film exhibiting characteristic of reflecting either left-handed circularly polarized light or right-handed circularly polarized light but transmitting the other part of light, such as an oriented film of a cholesteric liquid crystal polymer or a film including an oriented liquid crystal layer supported on a film base material.

Accordingly, in the luminance enhancement film of the type of transmitting linearly polarized light in a predetermined axis of polarization, when light transmitted through the luminance enhancement film is directly made incident onto the polarizing plate while the axis of polarization is made coincident with the predetermined axis, the light can be transmitted through the polarizing plate efficiently while absorption loss due to the polarizing plate can be suppressed. On the other hand, in the luminance enhancement film of the type of transmitting circularly polarized light such as a cholesteric liquid crystal layer, though the circularly polarized light can be made directly incident onto the polarizer, it is preferable from the point of view of suppression of absorption loss that the circularly polarized light is converted into linearly polarized light by a phase retarder to make the linearly polarized light incident onto the polarizing plate. Incidentally, a quarter-wave plate can be used as the phase retarder. In this case, the circularly polarized light can be converted into linearly polarized light.

The phase retarder functioning as a quarter-wave plate in a wide wavelength range such as a visible light wavelength range can be obtained, for example, by a method of superposing a phase retarder functioning as a quarter-wave plate for monochromatic light with a wavelength of 550 nm and a phase retarder exhibiting another phase retardation characteristic than that of the former-phase retarder, e.g., a phase retarder layer functioning as a half-wave plate for the monochromatic light with a wavelength of 550 nm. Therefore, the phase retarder disposed between the polarizing plate and the luminance enhancement film may be provided as one phase retarder layer or may be provided as a laminate of two or more phase retarder layers.

The cholestric liquid crystal layer may be also provided as a laminated structure having a combination of two or three or more layers different in reflection wavelength. In this case, the cholesteric liquid crystal layer exhibiting characteristic of reflecting circularly polarized light in a wide wavelength range such as a visible light wavelength range can be obtained, so that circularly polarized light transmitted in such a wide wavelength range can be obtained based on the cholesteric liquid crystal layer.

When the liquid crystal display optical film 2, 103 needs to be provided as a composite film made of a laminate of the polarizing plate 20, 130 and the phase retarder 23, 133 as shown in FIGS. 2 and 6 or needs to be provided as another composite film selected from the aforementioned various kinds of composite films, a suitable adhesive agent is used for laminating respective optical layers. And also the glass crack prevention adhesive agent according to the present invention may be used as occasion demands.

The material, composition, thickness, etc. of the adhesive agent are not particularly limited. From the point of view of transparency and durability, an acrylic adhesive agent may be used preferably. Incidentally, when the polarizing plate and any other optical layer are bonded to each other, their optical axes can be disposed at a suitable angle in accordance with the target phase retardation characteristic or the like.

Figure 3:
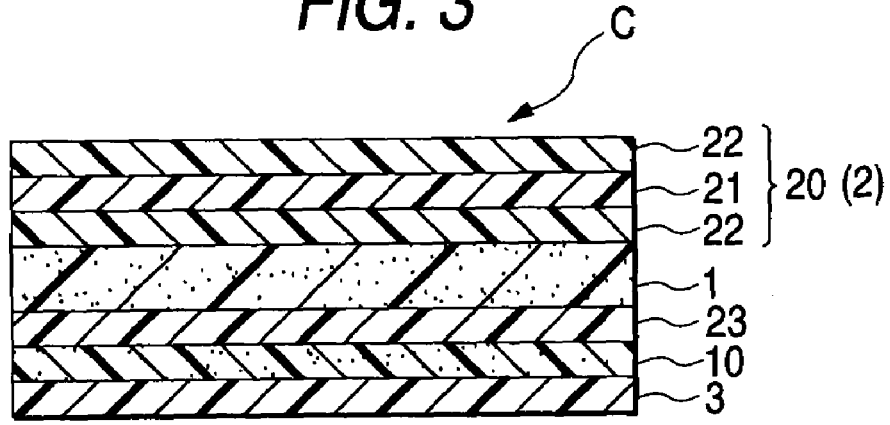
FIG. 3 is a sectional view showing a further example of the adhesive agent-including optical film (glass crack prevention laminate) according to the invention.

FIG. 3 shows the aforementioned case where the phase retarder 23 is laminated on the polarizing plate 20 through the glass crack prevention adhesive layer 1 according to the invention. Incidentally, the polarizing plate 20 is a laminate of a polarizer 21 and protective films 22, 22 provided on opposite surfaces of the polarizer 21. In this case, another adhesive layer 10 of an acrylic adhesive agent or the like for mounting the optical film on a liquid crystal panel is provided on the phase retarder 23. A releasable film 3 is stuck onto the adhesive layer 10.

The adhesive agent-including optical film C is a modified example according to the invention. The liquid crystal display optical film 2 made of the polarizing plate 20 configured as described above is laminated on a surface of the glass crack prevention adhesive layer 1. The adhesive layer 10 used generally is provided on the other surface of the glass crack prevention adhesive layer 1 through the phase retarder 23. The adhesive agent-including optical film C can be mounted on a liquid crystal panel through this layer 10.

Incidentally, optical axes of the respective optical layers can be arranged at suitable angles in accordance with aimed phase retardation characteristic or the like when the respective optical layers are laminated on one another. The optical layers may be laminated successively and individually in accordance with the process of production of a liquid crystal display device or the like. Alternatively, the optical layers maybe laminated to form an optical film in advance. The optical film formed by the latter method is preferred because it is excellent in stability of quality and processability.

Figure 4:
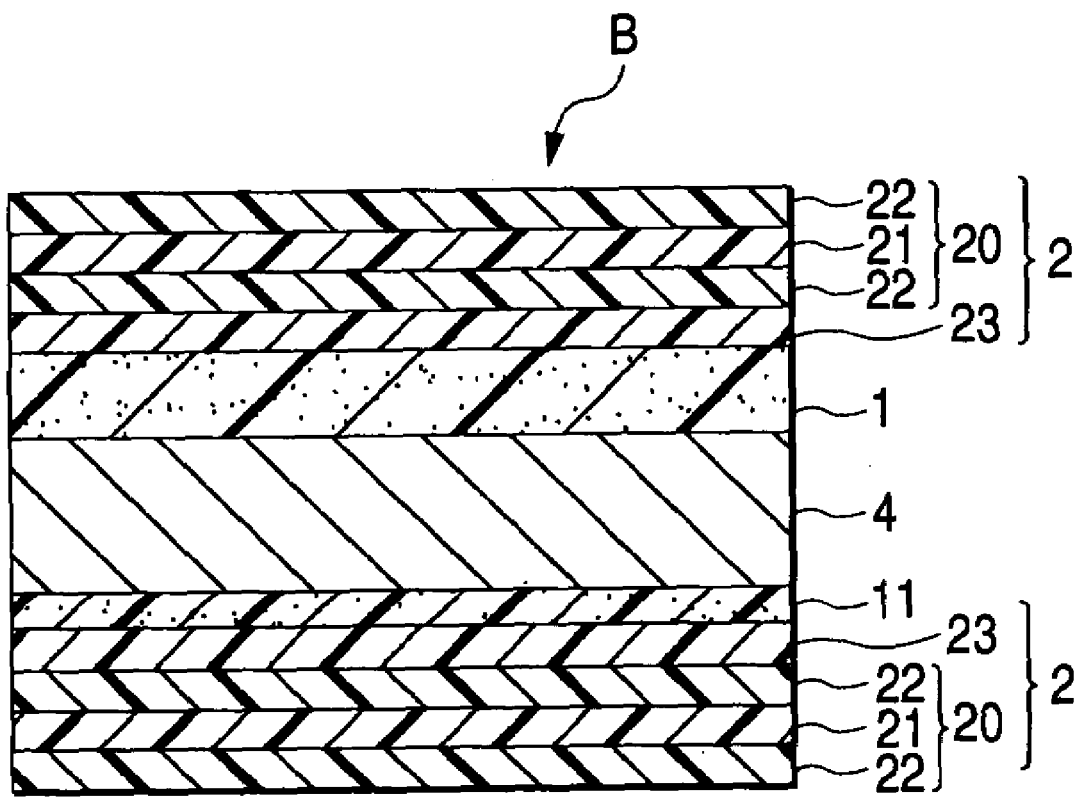
FIG. 4 is a sectional view showing an example of a liquid crystal display device which is formed in such a manner that the adhesive agent-including optical film (glass crack prevention laminate) depicted in FIG. 2 is mounted on a liquid crystal panel.

FIG. 4 shows a liquid crystal display device which is formed in such a manner that the adhesive agent-including optical film B configured as shown in FIG. 2 is used and directly mounted on a viewing side of a liquid crystal panel 4 with the glass crack prevention adhesive layer 1 provided on an inner side (that is, by using adhesion of the adhesive layer 1 in this case) after the releasable film 3 is removed from the adhesive agent-including optical film B. When the optical film B is directly mounted on the viewing side of the liquid crystal panel 4 in the aforementioned manner, the glass substrate of the liquid crystal panel 4 is protected by the glass crack prevention adhesive layer 1. As a result, cracking of glass can be prevented even in the case where external impact power of 0.5 J or higher to make it difficult to prevent cracking of glass in the background art acts on the liquid crystal panel 4.

Incidentally, in FIG. 4, another liquid crystal display optical film 2 made of a laminate (elliptically or circularly polarizing plate) of a polarizing plate 20 (formed as a laminate of a polarizer 21 and protective films 22, 22 provided on opposite surfaces of the polarizer 21) and a phase retarder 23 is further mounted on the rear surface of the liquid crystal panel 4 through an adhesive layer 11. In this manner, various kinds of optical films may be mounted on the rear surface side of the liquid crystal panel 4. The adhesive layer 11 for the mounting may be made of an acrylic adhesive agent generally used or may be made of the same material as that of the glass crack prevention adhesive layer 1.

In the glass crack prevention laminate A or B (adhesive agent-including optical film), the adhesive layer 10, 104 provided on the other surface side of the liquid crystal display optical film 2, 103 (polarizing plate 20, 130) is formed so that the adhesion of the adhesive layer 10, 104 can be used for bonding the liquid crystal display optical film 2, 103 to the viewing side of a liquid crystal panel directly. The composition and thickness of the adhesive layer 10, 104 are not particularly limited. An acrylic adhesive agent is preferred as a material used for forming the adhesive layer 10, 104. The adhesion of the adhesive layer 10, 104 is selected to be not lower than 0.5 N/25 mm width, preferably not lower than 1.0 N/25 mm width in terms of 90° peel adhesive strength. It is preferable from the point of view of reworkability that the adhesive layer 10, 104 has such removability that the liquid crystal display optical film 2, 103 can be removed easily after bonded. The removability of the adhesive layer 10, 104 is selected to be not lower than 10 N/25 mm width, preferably not lower than 8 N/25 mm width in terms of 90° peel adhesive strength measured after the adhesive layer 10, 104 is left for 40 days at 80° C.

In the adhesive agent-including optical film A or the glass crack preventions laminate A, the releasable film 3, 105 is bonded to the other surface side of the glass crack prevention adhesive layer 1, 104 in order to protect the adhesive layer 1, 104 and improve the handling property of the adhesive layer 1, 104. As the releasable film 3, 105 there is used a film excellent in smoothness, heat resistance, mechanical strength, etc. The film may be used after subjected to a known releasing process such as a silicone treatment, a fluorine treatment or a long-chain alkyl resin treatment directly or through another layer. Or the film may be used without any releasing process.

Examples of the material of the releasable film 3, 105 include a polyester resin, a (meth)acrylic resin, a polycarbonate resin, a polyethylene naphthalate resin, a polyethylene terephthalate resin, a triacetyl cellulose resin, an ARTON resin, an epoxy resin, a polyimide resin, a polyether-imide resin, a polyamide resin, a polysulfone resin, a polyphenylene sulfide resin, and a polyether-sulfone resin. From the point of view of handling property and half-cut punchability, the thickness of the releasable film 3 is selected to be in a range of from 25 μm to 500 μm, preferably in a range of 50 μm to 200 μm.

Figure 7:
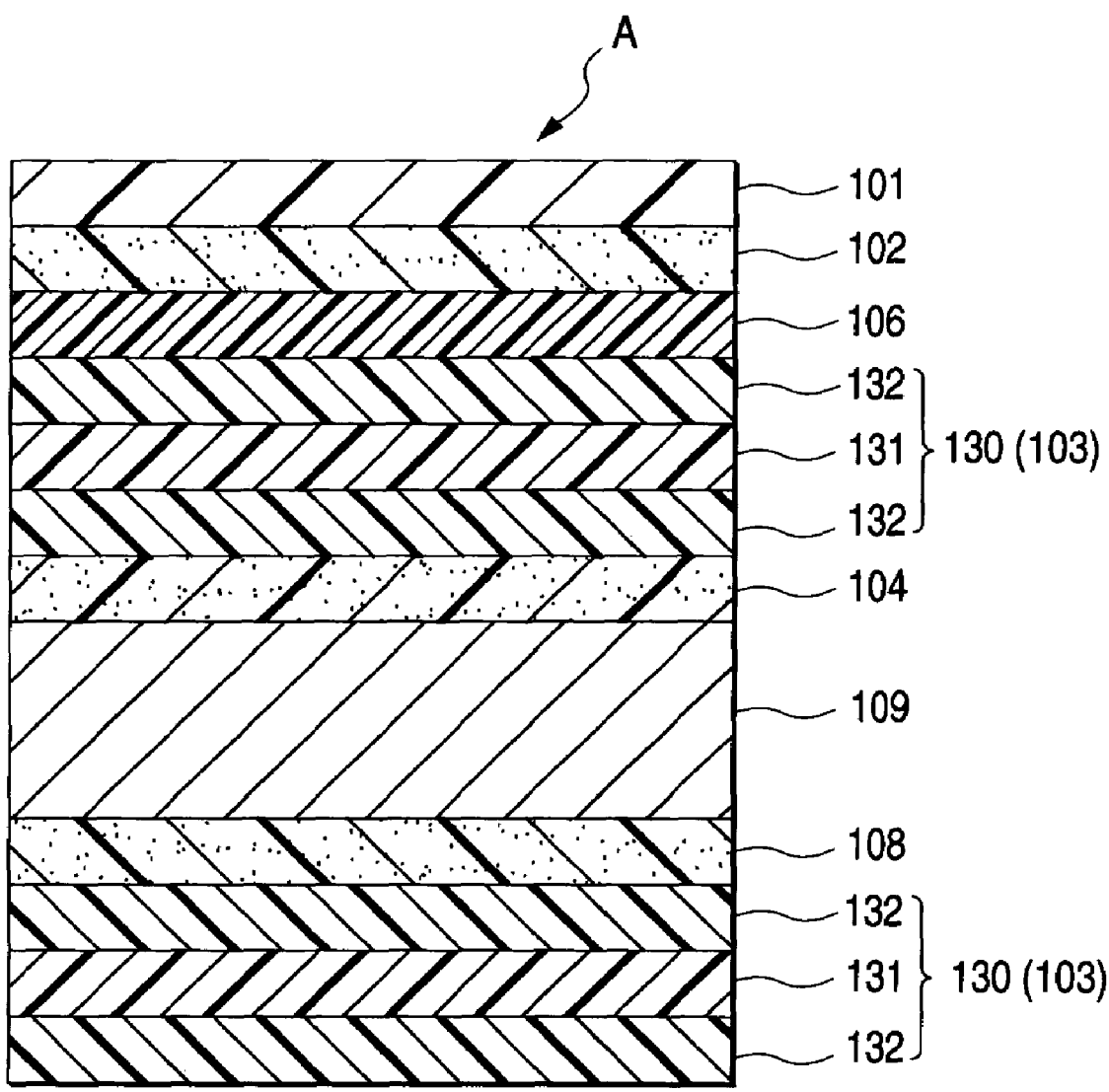
FIG. 7 is a sectional view showing an example of a liquid crystal display device in a state in which the glass crack prevention laminate depicted in FIG. 5 is mounted on a liquid crystal panel.

FIG. 7 shows a liquid crystal display device which is formed in such a manner that the glass crack prevention laminate A shown in FIG. 5 is directly mounted on a viewing side of a liquid crystal panel 109 through the adhesive layer 104 after the releasable film 105 is removed from the glass crack prevention laminate A.

When the glass crack prevention laminate A is directly mounted on the viewing side of the liquid crystal panel 109 as described above, the function of the liquid crystal display optical film 103 included in the laminate A and the function of the surface-treated film 101 located as the outer most surface can be expressed. Moreover, the glass crack prevention adhesive layer 102 can prevent the glass substrate of the liquid crystal panel 109 from cracking. This brings a good result in preventing the optical film 3 from being injured. In addition, disadvantages such as peeling, foaming, rising, etc. of the optical film 103 in a durability test such as a heat test or a moist heat test can be avoided by the presence of the undercoat layer 106. In this manner, excellent durability can be obtained. As a result, there can be provided a liquid crystal display device and a liquid crystal display method for excellent liquid crystal display.

Incidentally, in FIG. 7, another liquid crystal display optical film 103 made of a polarizing plate 130 formed as a laminate of a polarizer 131 and protective films 132, 132 provided on opposite surfaces of the polarizer 131 is further mounted on the rear surface of the liquid crystal panel 109 through an adhesive layer 108. Various kinds of optical films may be mounted on the rear surface side of the liquid crystal panel. The adhesive layer 108 for this device can be made of the same material as that of the adhesive layer 104. Especially, an acrylic adhesive agent is preferably used as the material of the adhesive layer 108.

The liquid crystal display device can be produced according to the background art. That is, the liquid crystal display device is generally produced in such a manner that a liquid crystal cell and a glass crack prevention laminate are assembled together with constituent parts such as an illumination system according to necessity so as to be incorporated in a drive circuit. The liquid crystal display device can be produced according to the background art except that the glass crack prevention laminate according to the invention is used. The liquid crystal cell is not particularly limited. If necessary, one layer or two or more layers of suitable parts selected from a diffusing plate, an anti-glare layer, an anti-reflection layer, a prism array, a lens array sheet, a light-diffusing plate, a backlight unit, etc. may be provided at a desired place or places when the liquid crystal display device is produced.

The adhesive agent-including optical film according to the invention can be preferably used for producing the liquid crystal display device. Moreover, the adhesive agent-including optical film according to the invention can be widely used for producing various kinds of apparatuses such as an illumination system in which various kinds of optical films inclusive of a polarizing plate need to be provided.

The invention will be described below more specifically in connection with Examples according to the invention. In the following description, "parts" means parts by weight.

The dynamic storage elastic modulus G' of the glass crack prevention adhesive layer is measured in terms of dynamic (shear) storage elastic modulus G' at 20° C. on the basis of temperature distribution measurement at a frequency of 1 Hz in a dynamic viscoelasticity spectrometer ("ARES Rheometer" made by Rheometric Scientific, Inc.).

EXAMPLE 1

(Formation of Glass Crack Prevention Adhesive Layer)

In a reaction vessel having a cooling pipe, a nitrogen introducing pipe, a thermometer, an ultraviolet irradiator and a stirrer, 100 parts of 2-ethylhexyl acrylate and 0.1 parts of 2,2'-dimethoxy-2-phenylacetophenone (photo-polymerization initiator) were put and polymerized by ultraviolet irradiation to obtain a polymer/monomer mixture solution polymerized at a rate of 8% by weight.

Then, 0.3 parts of trimethylpropane triacrylate (internal crosslinking agent), 0.2 parts of 1-hydroxy-cyclohexyl-phenylketone (photo-polymerization initiator) and 1 part of an anti-oxidizing agent ("IRGANOX1010" made by Ciba Specialty Chemicals) were added to 100 parts of the mixture solution to prepare a photo-polymerizable composition.

The photo-polymerizable composition was applied onto a 100 μm-thick polyester releasable film ("PET SEPA MRF" made by Mitsubishi Polyester Film Corp.). A 75 μm-thick polyester releasable film ("PET SEPA MRN" made by Mitsubishi Polyester Film Corp.) lighter in peel force than the 100 μm-thick polyester releasable film was put on the photo-polymerizable composition so that the photo-polymerizable composition was covered with the 75 μm-thick polyester releasable film. While cooled at −15° C., the photo-polymerizable composition was photo-polymerized by ultraviolet irradiation of 4000 mJ/cm$^2$ from an ultraviolet lamp to produce a 1 mm-thick glass crack prevention adhesive layer. The glass crack prevention adhesive layer exhibited a dynamic storage elastic modulus G' of $3\times10^4$ Pa at 20° C.

(Preparation of Adhesive Agent Solution)

While 96 parts of butyl acrylate, 3.9 parts of acrylic acid, 0.1 parts of 2-hydroxyethyl acrylate, 0.3 parts of azobisisobutyronitrile and 250 parts of ethyl acetate as a solvent were stirred, a polymerization reaction was performed at about 60° C. for 6 hours to obtain an acrylic polymer solution having a weight average molecular weight of 1630000.

Then, an isocyanate polyfunctional compound ("CORONATE L" made by Nippon Polyurethane Industry Co., Ltd.) was added to the acrylic polymer solution at the mixture ratio of 0.5 parts of the isocyanate polyfunctional compound to 100 parts of the polymer solid component of the acrylic polymer solution to thereby prepare an adhesive agent solution.

(Production of Liquid Crystal Display Optical Film)

An 80 μm-thick polyvinyl alcohol film was stretched by five times in an aqueous solution of iodine and then dried to prepare a polarizer. Triacetyl cellulose films as transparent protective films were bonded to opposite surfaces of the polarizer through adhesive agents respectively to produce a polarizing plate. A hard-coating process and an anti-reflection process were applied to a surface (viewing side) of the polarizing plate. The adhesive agent solution prepared as described above was applied on the other surface of the polarizing plate and dried to form a 25 μm-thick adhesive layer. A 50 μm-thick polycarbonate film (made by Kaneka Corp.) as a phase retarder was laminated on the polarizing plate through the 25 μm-thick adhesive layer to thereby produce a liquid crystal display optical film.

(Production of Adhesive Agent-Including Optical Film and Liquid Crystal Display Device)

After the polyester releasable film (PET SEPA MRN) was removed from the liquid crystal display optical film, the 1 mm-thick glass crack prevention adhesive layer was stuck to the phase retarder side of the liquid crystal display optical film to produce an adhesive agent-including optical film.

After the polyester releasable film (PET SEPA MRF) was removed from the glass crack prevention adhesive layer of the adhesive agent-including optical film, the adhesive agent-including optical film was bonded to the viewing side of a liquid crystal panel. The phase retarder side of another liquid crystal display optical film (which was formed while the formation of the anti-reflection layer on the triacetyl cellulose film surface as the lowermost portion was omitted) was stuck onto the opposite surface (rear surface) of the liquid crystal panel through the adhesive layer formed from the adhesive agent solution. Thus, a liquid crystal display device was produced.

EXAMPLE 2

A glass crack prevention adhesive layer was produced in the same manner as in Example 1 except that 100 parts of 2-ethylhexyl acrylate were replaced by 100 parts of butyl acrylate at the time of production of the glass crack prevention adhesive layer. An adhesive agent-including optical film and a liquid crystal display device were produced in the same manner as in Example 1 except that the glass crack prevention adhesive layer produced in the aforementioned manner was used. Incidentally, the dynamic storage elastic modulus G' of the glass crack prevention adhesive layer was $7\times10^4$ Pa at 20° C.

EXAMPLE 3

A glass crack prevention adhesive layer was produced in the same manner as in Example 1 except that 100 parts of 2-ethylhexyl acrylate were replaced by 98 parts of isooctyl acrylate and 2 parts of acrylic acid at the time of production of the glass crack prevention adhesive layer. An adhesive agent-including optical film and a liquid crystal display device were produced in the same manner as in Example 1 except that the glass crack prevention adhesive layer produced in the aforementioned manner was used. Incidentally, the dynamic storage elastic modulus G' of the glass crack prevention adhesive layer was $5 \times 10^4$ Pa at 20° C.

EXAMPLE 4

A glass crack prevention adhesive layer was produced in the same manner as in Example 1 except that 100 parts of 2-ethylhexyl acrylate were replaced by 80 parts of 2-ethylhexyl acrylate and 20 parts of 4-hydroxybutyl acrylate at the time of production of the glass crack prevention adhesive layer. An adhesive agent-including optical film and a liquid crystal display device were produced in the same manner as in Example 1 except that the glass crack prevention adhesive layer produced in the aforementioned manner was used. Incidentally, the dynamic storage elastic modulus G' of the glass crack prevention adhesive layer was $3 \times 10^4$ Pa at 20° C.

EXAMPLE 5

A glass crack prevention adhesive layer was produced in the same manner as in Example 1 except that the thickness of the glass crack prevention adhesive layer was changed from 1 mm to 500 µm. An adhesive agent-including optical film and a liquid crystal display device were produced in the same manner as in Example 1 except that the glass crack prevention adhesive layer produced in the aforementioned manner was used.

COMPARATIVE EXAMPLE 1

A glass crack prevention adhesive layer was produced in the same manner as in Example 1 except that the thickness of the glass crack prevention adhesive layer was changed from 1 mm to 25 µm. An adhesive agent-including optical film and a liquid crystal display device were produced in the same manner as in Example 1 except that the glass crack prevention adhesive layer produced in the aforementioned manner was used.

COMPARATIVE EXAMPLE 2

A glass crack prevention adhesive layer was produced in the same manner as in Example 1 except that the thickness of the glass crack prevention adhesive layer was changed from 1 mm to 50 µm. An adhesive agent-including optical film and a liquid crystal display device were produced in the same manner as in Example 1 except that the glass crack prevention adhesive layer produced in the aforementioned manner was used.

The liquid crystal display device obtained in each of Examples 1 to 5 and Comparative Examples 1 and 2 was subjected to a crack prevention test by the following method. Table 1 shows test results. Incidentally, the dynamic storage elastic modulus G' at 20° C. and the thickness of the glass crack prevention adhesive layer used for producing the liquid crystal display device are shown in Table 1 for the sake of reference.

(Crack Prevention Test)

In the condition that a steel ball having a diameter of 50 mm and a weight of 510 g was dropped down from a height of 10 cm to the liquid crystal display device, a judgment was made by eye observation as to whether the glass substrate of the liquid crystal display device cracked or not. Incidentally, impact energy produced by the falling of the steel ball was about 0.5 J because the impact energy was calculated by the following expression:

$$W \times H \times A = 0.51 \times 0.1 \times 9.81$$

in which W is the weight (kgf) of the steel ball, H is the height (m) from which the steel ball falls, and A is the gravitational acceleration (m/s$^2$)

Although there is actually no standardization about glass crack prevention characteristic of the liquid crystal panel, it is said actually that glass crack prevention characteristic of 0.5 J or higher is sufficient. In this glass crack prevention test, the case where cracking/breaking was not observed in the glass substrate was regarded as ○, and the case where cracking/breaking was observed in the glass substrate (i.e. blurring was observed in liquid crystal) was regarded as X.

TABLE 1

| | Dynamic Storage Elastic Modulus G' at 20° C. (Pa) | Thickness (µm) | Crack prevention Test [0.5 J] |
|---|---|---|---|
| Example 1 | $3 \times 10^4$ | 1000 | ○ |
| Example 2 | $7 \times 10^4$ | 1000 | ○ |
| Example 3 | $5 \times 10^4$ | 1000 | ○ |
| Example 4 | $3 \times 10^4$ | 1000 | ○ |
| Example 5 | $3 \times 10^4$ | 500 | ○ |
| Comparative Example 1 | $3 \times 10^4$ | 25 | X |
| Comparative Example 2 | $3 \times 10^4$ | 50 | X |

It is obvious from results of Table 1 that the liquid crystal display device obtained in each of Examples 1 to 5 according to the invention is more excellent than the liquid crystal display device obtained in Comparative Example 1 or 2 because the glass crack prevention adhesive layer used in the liquid crystal display device obtained in each of Examples 1 to 5 can effectively prevent glass of the liquid crystal panel from cracking.

EXAMPLE 6

(Formation of Glass Crack Prevention Adhesive Layer)

In a reaction vessel having a cooling pipe, a nitrogen importing pipe, a thermometer, an ultraviolet irradiator and a stirrer, 83.6 parts of 2-ethylhexyl acrylate and 16.4 parts of 4-hydroxybutyl acrylate as a glass crack prevention adhesive agent and 0.05 parts of 2,2-dimethoxy-2-phenylacetophenone ("IRGACURE-651" made by Ciba Specialty Chemicals) and 0.05parts of 1-hydroxy-cyclohexyl-phenylketone ("IRGACURE Ir-184" made by Ciba Specialty Chemicals) as a photo-polymerization initiator were put and polymerized by ultraviolet irradiation to obtain an acrylic polymer/monomer mixture solution polymerized at a rate of 10% by weight.

Then, 0.2 parts of trimethylpropane triacrylate as a crosslinking agent and 0.15 parts of 1-hydroxy-cyclohexyl-phenylketone ("IRGACURE Ir-184" made by Ciba Specialty Chemicals) as a photo-polymerization initiator were added to 100 parts of the mixture solution. The resulting mixture solution was applied onto a 100 μm-thick polyester separator ("PET SEPA MRF" made by Mitsubishi Polyester Film Corp.). A 75 μm-thick polyester separator ("PET SEPA MRN" made by Mitsubishi Polyester Film Corp.) lighter in peel force than the 100 μm-thick polyester separator and serving as a cover separator was put on the mixture solution so that the mixture solution was covered with the 75 μm-thick polyester separator. While cooled at −15° C., the mixture solution was photo-polymerized by ultraviolet irradiation of 4000 mJ/cm² from an ultraviolet lamp to produce a 0.4 mm-thick glass crack prevention adhesive layer. The glass crack prevention adhesive layer exhibited a storage elastic modulus G' of 1×10⁵ Pa at 20° C.

(Formation of Undercoat Layer)

A toluene solution of a polyisocyanate compound ("CORONATE HL" made by Nippon Polyurethane Industry Co., Ltd.) was applied onto a surface of a triacetyl cellulose film as a protective film of a liquid crystal display optical film (polarizing plate) (which will be described later) so that the solution would be 0.5 μm thick after drying. The solution was dried to form an undercoat layer.

(Formation of Adhesive Layer)

While 100 parts of butyl acrylate, 5 parts of acrylic acid and 0.075 parts of 2-hydroxyethyl acrylate were stirred together with 0.3 parts of azobisisonitrile and 250 parts of ethyl acetate, reaction was performed at about 60° C. for 6 hours to obtain an acrylic polymer solution having a weight average molecular weight of 1630000.

Into the acrylic polymer solution, 0.6 parts of a polyisocyanate compound ("CORONATE L" made by Nippon Polyurethane Industry Co., Ltd.) and 0.08 parts of a silane coupling agent ("KBM403" made by Shin-Etsu Chemical Co., Ltd.) per 100 parts of the polymer solid component of the acrylic polymer solution were added and mixed while stirred well to prepare an adhesive solution. The adhesive solution was applied as a releasable film onto a 75 μm-thick polyester separator ("PET SEPA MRN" made by Mitsubishi Polyester Film Corp.) and dried to form a 23 μm-thick adhesive layer.

(Production of Liquid Crystal Display Optical Film (Polarizing Plate))

An 80 μm-thick polyvinyl alcohol film was stretched by five times in an aqueous solution of iodine and dried to prepare a polarizer. Triacetyl cellulose films as protective films were laminated on opposite surfaces of the polarizer through adhesive agents respectively to produce a polarizing plate as a liquid crystal display optical film.

(Production of Surface-Treated Film)

A surface of a polyethylene terephthalate film ("PET#125-A4300" made by Toyobo Co., Ltd.) was subjected to a hard-coating process and an anti-reflection process. The other surface of the polyethylene terephthalate film was further subjected to a corona process. In this manner, a surface-treated film was produced from the polyethylene terephthalate film.

(Production of Glass Crack Prevention Laminate)

The undercoat layer was formed on a surface of the triacetyl cellulose film which was one of the protective films in the polarizing plate (liquid crystal display optical film). Then, after the separators were separated from opposite surfaces of the glass crack prevention adhesive layer, the glass crack prevention adhesive layer was bonded onto the undercoat layer. Then, the corona-treated surface of the surface-treated film was bonded onto the glass crack prevention adhesive layer. Then the other adhesive layer was bonded together with the releasable film onto the other surface of the polarizing plate. In this manner, a glass crack prevention laminate was produced.

(Production of Liquid Crystal Display Device)

After the releasable film was separated from the glass crack prevention laminate, the glass crack prevention laminate was bonded onto a front surface of a liquid crystal panel with the adhesive layer facing inward. Accordingly, a laminated structure in which the surface-treated film, the glass crack prevention adhesive layer, the undercoat layer, the polarizing plate (as an arrangement of a protective film, a polarizer and a protective film), the adhesive layer and the liquid crystal panel were arranged in order was formed. A polarizing plate (as an arrangement of a protective film, a polarizer and a protective film) was laminated on a rear surface of the liquid crystal panel through another adhesive layer the same as described above. In this manner, a liquid crystal display device was produced.

EXAMPLE 7

A glass crack prevention laminate and a liquid crystal display device were produced in the same manner as in Example 6 except that the undercoat layer was made of polyethylene-imine ("EPOMIN P-1000" made by Nippon Shokubai Co., Ltd.) so that the undercoat layer was 0.5 μm thick.

EXAMPLE 8

A glass crack prevention laminate and a liquid crystal display device were produced in the same manner as in Example 6 except that the undercoat layer was made of an adhesive agent (the same as used for forming the adhesive layer in Example 6) containing a polyisocyanate compound so that the undercoat layer was 20 μm thick.

EXAMPLE 9

A glass crack prevention laminate and a liquid crystal display device were produced in the same manner as in Example 6 except that the thickness of the glass crack prevention adhesive layer was changed to 1 mm (1000 μm).

COMPARATIVE EXAMPLE 3

A glass crack prevention laminate and a liquid crystal display device were produced in the same manner as in Example 6 except that the thickness of the glass crack prevention adhesive layer was changed to 25 μm.

COMPARATIVE EXAMPLE 4

A glass crack prevention adhesive layer was formed in the same manner as in Example 6 except that 83.6 parts of 2-ethylhexyl acrylate and 16.4 parts of 4-hydroxybutyl acrylate as the monomer composition of the adhesive agent were replaced by 100 parts of 2-ethylhexyl acrylate. A glass crack prevention laminate and a liquid crystal display device were produced in the same manner as in Example 6 except that the glass crack prevention adhesive layer was used.

COMPARATIVE EXAMPLE 5

A glass crack prevention laminate and a liquid crystal display device were produced in the same manner as in Example 6 except that the formation of the undercoat layer was omitted.

The liquid crystal display device obtained in each of Examples 6 to 9 and Comparative Examples 3 to 5 was subjected to a glass crack prevention characteristic test and a durability test by the following methods, so that the performance of the liquid crystal device was evaluated. Results of the evaluation were as shown in Table 1.

(Glass Crack Prevention Characteristic Test)

In the condition that a pendulum of a steel ball having a diameter of 50 mm and a weight of 510 gf was dropped onto the surface-treated film of the liquid crystal display device from above (10 cm height), an examination was made by eye observation as to whether the glass substrate of the liquid crystal panel cracked or not. Impact energy produced by the falling of the steel ball was about 0.5 J because the impact energy was calculated by the following expression:

$$W \times H \times A = 0.51 \times 0.1 \times 9.81$$

in which W is the weight (kgf) of the steel ball, H is the height (m) from which the steel ball falls, and A is the gravitational acceleration (m/s$^2$).

In this test, the case where cracking/breaking was not observed in the glass substrate was regarded as ○, and the case where cracking/breaking was observed in the glass substrate (i.e. blurring was observed in liquid crystal) was regarded as X.

(Durability Test)

The liquid crystal display device was left at 80° C. for 500 hours in a heat test. The liquid crystal display device was left at 60° C. and 90% RH for 500 hours in a moist heat test. In each test, external appearance of the device was examined by eye observation. In each test, the case where disadvantages such as peeling, foaming, rising, etc. were not observed in the glass crack prevention adhesive layer provided for the liquid crystal display optical film (polarizing plate) and in the surface-treated film provided on the glass crack prevention adhesive layer was regarded as ○, and the case where disadvantages such as peeling, foaming, rising, etc. were observed was regarded as X.

TABLE 2

| | Glass crack prevention Characteristic | Durability (External Appearance) | |
|---|---|---|---|
| | | Heat Test | Moist Heat Test |
| Example 6 | ○ | ○ | ○ |
| Example 7 | ○ | ○ | ○ |
| Example 8 | ○ | ○ | ○ |
| Example 9 | ○ | ○ | ○ |
| Comparative Example 3 | X | ○ | ○ |
| Comparative Example 4 | ○ | X | X |
| Comparative Example 5 | ○ | X | X |

As is obvious from results of Table 2, the liquid crystal display device using the glass crack prevention laminate obtained in each of Examples 6 to 9 is excellent in glass crack prevention characteristic and excellent in durability because there is no disadvantage such as peeling, foaming, rising, etc. for the liquid crystal display optical film both in the heat test and the moist heat test. On the other hand, the liquid crystal display device using the glass crack prevention laminate obtained in each of Comparative Examples 3 to 5 is inferior in either glass cracking preventing characteristic or durability.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A glass crack prevention laminate comprising:
    a glass crack prevention adhesive layer having a dynamic storage elastic modulus G' of not larger than $1 \times 10^7$ Pa at 20° C.;
    a liquid crystal display optical film laminated on a surface of said glass crack prevention adhesive layer; and
    an undercoat layer disposed between said glass crack prevention adhesive layer and said liquid crystal display optical film.

2. A glass crack prevention laminate according to claim 1, wherein said liquid crystal display optical film is made of a polarizing plate or a combination of a polarizing plate and another optical layer.

3. A glass crack prevention laminate according to claim 1, wherein said glass crack prevention adhesive layer has a thickness of 0.1 mm to 5 mm.

4. A glass crack prevention laminate according to claim 1, wherein said glass crack prevention adhesive layer has a thickness of 0.1 mm to 3 mm.

5. A glass crack prevention laminate according to claim 1, wherein said glass crack prevention adhesive layer has removability.

6. A glass crack prevention laminate according to claim 1, wherein said glass crack prevention adhesive layer contains a polar group.

7. A glass crack prevention laminate according to claim 1, wherein said glass crack prevention adhesive layer has transmissivity of 60% or higher.

8. A glass crack prevention laminate according to claim 1, wherein said glass crack prevention adhesive layer has the dynamic storage elastic modulus G' in a range of from $1 \times 10^3$ Pa to $7 \times 10^6$ Pa at 20° C.

9. A glass crack prevention laminate according to claim 1, wherein said glass crack prevention adhesive layer comprises a composite material containing a high-molecular compound as a transparent resin or rubber component, and organic stratified clay minerals dispersed in said high-molecular compound, and said high-molecular compound has a dynamic storage elastic modulus G' of not larger than $6 \times 10^6$ Pa.

10. A glass crack prevention laminate according to claim 9, wherein said high-molecular compound has a dynamic storage elastic modulus G' of in a range of from $1 \times 10^3$ Pa to $1 \times 10^5$ Pa at 20° C.

11. A glass crack prevention laminate according to claim 1, further comprising:
    a surface-treated film provided on said glass crack prevention adhesive layer.

12. A glass crack prevention laminate according to claim 1, wherein said undercoat layer is made of a member selected from the group consisting of a (poly)isocyanate compound, a (poly)ethylene-imine compound and an adhesive agent containing a (poly)isocyanate compound.

13. A method for displaying using a liquid crystal display comprising steps of: directly mounting a glass crack prevention laminate defined in claim 11, on a liquid crystal panel through an adhesive agent while locating said surface-treated film of said glass crack prevention laminate as an outermost surface, wherein liquid crystal display is performed in this state.

14. A liquid crystal display device comprising a liquid crystal panel, and a glass crack prevention laminate defined in claim 1 and directly mounted on said liquid crystal panel so that said glass crack prevention adhesive layer of said glass crack prevention laminate is located as an inner side.

15. A liquid crystal display device comprising a liquid crystal panel, and a glass crack prevention laminate defined in claim 11 and directly mounted on said liquid crystal panel through an adhesive agent while said surface-treated film of said glass crack prevention laminate is located as an outermost surface.

* * * * *